(12) United States Patent
Brewer et al.

(10) Patent No.: US 12,366,384 B2
(45) Date of Patent: Jul. 22, 2025

(54) SUPPLEMENTAL SOLAR CONCENTRATOR FOR THE HEATING OF PARTICLES

(71) Applicant: Blueshift, LLC, Broomfield, CO (US)

(72) Inventors: Andrew Timon Brewer, Wheat Ridge, CO (US); Ryan Garvey, Lafayette, CO (US); Alan Thomas Carter, Arvada, CO (US); Austin Kenneth Miller, Niwot, CO (US); Troy Southard, Edgewater, CO (US)

(73) Assignee: Blueshift, LLC, Broomfield, CO (US)

( * ) Notice: Subject to any disclaimer, the term of this patent is extended or adjusted under 35 U.S.C. 154(b) by 450 days.

(21) Appl. No.: 17/983,266

(22) Filed: Nov. 8, 2022

(65) Prior Publication Data

US 2023/0152008 A1 May 18, 2023

Related U.S. Application Data

(60) Provisional application No. 63/280,185, filed on Nov. 17, 2021.

(51) Int. Cl.
*F24S 50/80* (2018.01)
*F24S 23/71* (2018.01)
*F24S 40/55* (2018.01)

(52) U.S. Cl.
CPC ............ *F24S 50/80* (2018.05); *F24S 23/71* (2018.05); *F24S 40/55* (2018.05)

(58) Field of Classification Search
CPC ............ F24S 80/20; F24S 23/71; F24S 40/55; F24S 20/30; F24S 50/40; F24S 20/20; F24S 50/80; F24S 60/00
See application file for complete search history.

(56) References Cited

U.S. PATENT DOCUMENTS

| | | | |
|---|---|---|---|
| 5,348,696 | A | 9/1994 | Gibson |
| 8,378,280 | B2 | 2/2013 | Mills |
| 9,726,155 | B2 * | 8/2017 | Anderson ............... F03G 6/064 |
| 10,793,733 | B2 | 10/2020 | Shah |

(Continued)

FOREIGN PATENT DOCUMENTS

WO    WO 2019/034534    2/2019

OTHER PUBLICATIONS

International Search Report and Written Opinion mailed Feb. 15, 2023 in PCT/US2022/049340.

(Continued)

*Primary Examiner* — Alfred Basichas
(74) *Attorney, Agent, or Firm* — Critical Path IP Law, LLC

(57) ABSTRACT

A solar energy particle receiver system and method of use for precise and controlled heating, sintering, and/or phase change of particles. In one embodiment, the solar energy particle receiver system directs sunlight from a primary concentrator into supplemental concentrating reflective optic where the emitted sunlight is used to heat and sinter, melt, or induce a phase change of the particles such as regolith at a controlled temperature, the supplemental concentrating reflective optics cooled to prevent overheating and a sweeping gas directed at the reflective surface to prevent optical fouling. In one aspect, the supplemental concentrating reflective optic is a compound reflective concentrator. In one application, the particles are a regolith, such as a lunar regolith.

20 Claims, 10 Drawing Sheets

(56) References Cited

U.S. PATENT DOCUMENTS

| | | | |
|---|---|---|---|
| 10,876,521 B2* | 12/2020 | Anderson | F24S 10/70 |
| 12,305,888 B2* | 5/2025 | Anderson | F02C 1/05 |
| 2008/0314438 A1 | 12/2008 | Tran | |
| 2013/0206135 A1 | 8/2013 | Ko | |
| 2014/0166077 A1 | 6/2014 | Gupta | |
| 2014/0230807 A1 | 8/2014 | von Kries | |
| 2018/0158966 A1 | 6/2018 | Breen | |
| 2018/0195498 A1 | 7/2018 | Anderson | |
| 2019/0326852 A1 | 10/2019 | Ho | |
| 2019/0346177 A1 | 11/2019 | Jafarian | |
| 2020/0191443 A1 | 6/2020 | Garvey | |
| 2022/0268488 A1 | 8/2022 | Brewer | |
| 2022/0274077 A1 | 9/2022 | Brewer | |

OTHER PUBLICATIONS

Wong, Refractive Secondary Solar Concentrator Demonstrated High-Temperature Operation, Research and Technology, 2001.

Nakamura, T., Solar Thermal System for Lunar ISRU Applications: Development and Field Operation at Mauna Kea, HI, 49th AIAA Aerospace Sciences Meeting, p. 433, Jan. 2011.

Hischier, I., A Modular Ceramic Cavity-Receiver for High-Temperature High-Concentration Solar Applications, Journal of solar energy engineering, 134(1), 2012.

Hischier, I., Experimental and Numerical Analyses of a Pressurized Air Receiver for Solar-Driven Gas Turbines, 2012.

Menon, A., Optical Analysis of Variable Aperture Mechanism for a Solar Reactor, World Acad Sci Eng Technol, 59, 925-9; 2011.

Kodama, Flux Measurement of a New Beam-Down Solar Concentrating System in Miyazaki for Demonstration of Thermochemical Water Splitting Reactors, Energy Procedia, 49, 2014.

Nakamura, Optical Waveguide Solar Power System for Material Processing in Space, Journal of Aerospace Engineering, 28(1), 2015.

Rajeb, Novel Solar PV/Thermal Collector Design for the Enhancement of Thermal and Electrical Performances, Renewable energy, 146, 2020.

Salem, Failure Analysis of Sapphire Refractive Secondary Concentrators, No. E-17063, 2009.

* cited by examiner

SUPPLEMENTAL SOLAR CONCENTRATOR FOR THE HEATING OF PARTICLES

CROSS-REFERENCE TO RELATED APPLICATIONS

This application is a nonprovisional patent application of and claims the benefit of U.S. Provisional Patent Application No. 63/280,185 titled "Sintering End Effector for Regolith" and filed Nov. 17, 2021, the disclosure of which is hereby incorporated herein by reference in entirety.

STATEMENT

This invention was made with government support under Contract No. 80NSSC21C0133 awarded by the National Aeronautics and Space Administration (NASA). The government has certain rights in the invention. (NASA Case No. MFS-34245-1).

FIELD

The disclosure relates generally to a supplemental solar concentrator for the heating of particles and method of use, in particular to a solar energy, vertically oriented particle receiver providing precise and controlled heating, sintering, and/or phase change of particles.

BACKGROUND

Particle sintering through solar energy may provide benefits in both terrestrial and lunar environments, to include thermal energy storage, electricity generation, and enablement of chemical reactions such as phase changes. Several methods for sintering have been explored and include direct application of concentrated solar energy (CSE) and microwave sintering. CSE is an ideal, abundantly available heat source in space and on the Earth, but the conventional technologies do not provide precision temperature control and suffer from large efficiency losses.

Selective sintering of lunar regolith has been a topic of interest to NASA for over a decade due to the disruptive benefits in-situ resource utilization (ISRU) may have on space exploration costs and logistics.

The disclosed technology addresses these needs and improves upon state-of-the-art solar concentration and sintering capabilities by isolating the CSE delivery system (fiber optic or other, for example) from the high temperatures produced on the working surface using a universal end effector that efficiently delivers an output flux density distribution tailored for the receiver material, feed system, and path of particles being heated at controlled temperatures without causing thermal failure of optical components. The disclosed solar energy particle receiver system acts as a standalone system for enhancing solar thermal applications including additive manufacturing, calcination of limestone, oxygen extraction from regolith, surface paving, and additive construction.

SUMMARY

The disclosed solar energy particle receiver system consists of a reflective supplemental solar concentrator for heating a target to high temperatures using concentrated solar energy. The system includes integrated cooling to enable operation over long duration without overheating the optic. In one embodiment, the particle receiver system may serve as a robot end effector to accept concentrated sunlight from a primary solar concentrator and transmit the concentrated sunlight with even greater concentration onto the lunar surface in order to selectively sinter and/or melt the lunar soil for additive manufacturing and additive construction on the Moon. Previous attempts at supplemental solar concentrators or end-effectors for high temperature processes utilized a lens or similar refractive optic which consistently failed due to overheating or fouling when placed near the high temperature target. See, e.g., Wong, *Refractive Secondary Solar Concentrator Demonstrated High-Temperature Operation*, Research and Technology, 2001, incorporated by reference for all purposes. These failures do not occur with the disclosed particle receiver system and only minor fouling has been observed. While the disclosed particle receiver system was developed for lunar additive manufacturing and additive construction, the disclosure has broader ramifications for more efficiently heating materials to very high temperatures using CSE. Another additive manufacturing method enabled with the disclosed system is solar Directed Energy Deposition (DED) in which a stream of material is fed into a heated spot while the supplemental concentrator is translated to move the molten pool and additively manufacture a 3-dimensional (3D) part.

As developed for solar additive manufacturing and construction, the particle receiver system may be incorporated into several future NASA missions to near earth asteroids, the lunar surface, Martian moons, Mars orbit, and the Martian surface. The particle receiver system technology is most useful anywhere that electrical infrastructure is not present and sufficient sunlight is available. The technology is ideal for enhancing a solar additive manufacturing system and would be attractive to underserved communities in the US, in developing countries around the world, and in the burgeoning commercial space industry.

The particle receiver system addresses the need for a sintering end effector and improves upon state-of-the-art solar concentrator and sintering capabilities by, among other things, isolating the solar delivery system (fiber optic or other, for example) from the high temperatures produced on the working surface with a universal end effector that delivers solar thermal energy efficiently at specific temperatures without failure or melting of the optics. The particle receiver system also provides a reflective (supplemental) concentrator optic and an integrated cooling subsystem for the optic. The reflective (supplemental) concentrator optic also reduces spot size and enhances concentration beyond the primary concentrator's capabilities, making it ideal for precision applications like additive manufacturing (AM) and additive construction.

In one embodiment, the particle receiver system provides up to or approximately five (5) times improved concentration of the light or solar energy of the primary concentrator. In one embodiment, the particle receiver system provides up to or approximately twelve (12) times improved concentration of the light or solar energy of the primary concentrator. In one embodiment, the particle receiver system provides up to or approximately one hundred (100) times improved concentration of the light or solar energy of the primary concentrator. For construction and surface conditioning applications like paving and dust mitigation, the Compound Parabolic Concentrator (CPC) of the particle receiver system evenly distributes the solar energy across the outlet, enabling for more consistent, efficient, and controllable processes.

In one embodiment, a particle receiver system is disclosed, the system comprising: a supplemental concentrator configured to receive a primary concentrator light pattern from a primary concentrator and output a supplemental concentrator output light pattern, the supplemental concentrator comprising reflective optics, the supplemental concentrator output light pattern having a second light profile and the primary concentrator having a first light profile; a sweeping fluid device operating to circulate a sweeping fluid within the supplemental concentrator; a cooler employing cooling fluid to enable temperature control of the supplemental concentrator; an actuator to position the supplemental concentrator relative to an irradiating location; a working material feed delivering a working material to the irradiating location; and a controller operating to control each of: i) the actuator, ii) the temperature of the supplemental concentrator, and iii) the temperature of the irradiating location; wherein: the supplemental concentrator output light pattern irradiates the working material at the irradiating location to yield a reacted material.

In one aspect, the second light profile is a spatially reduced light profile relative to the first light profile. In another aspect, the supplemental concentrator is a compound parabolic concentrator and the particle receiver system is a falling particle receiver system. In another aspect, the reacted material enables at least one of thermal energy storage and electricity generation. In another aspect, the system further comprises a gas collector configured to collect any gas produced from the reacted material. In another aspect, the cooler encircles the supplemental concentrator and comprises a heat exchange surface. In another aspect, the controller further operates to control a speed of delivery of the working material.

In another embodiment, a method of operating a particle receiver system to produce a reacted material is disclosed, the method comprising: providing a particle receiver system comprising: a supplemental concentrator comprising reflective optics; a cooler coupled to the supplemental concentrator; a sweeping fluid device in fluid communication with the supplemental concentrator and with the cooler; an actuator; a working material feed; and a controller in communication with the actuator, the cooler, and the sweeping fluid device; receiving, by the supplemental concentrator, a primary concentrator light pattern from a primary concentrator; circulating a sweeping fluid within the supplemental concentrator; controlling, using the controller, the temperature of the supplemental concentrator; delivering, by way of the working material feed, the working material to a defined irradiating location; positioning, using the actuator as controlled by the controller, the supplemental concentrator relative to the irradiating location; directing a supplemental concentrator output light pattern to the irradiating location; irradiating the working material with the supplemental concentrator output light pattern; and controlling, using the controller, the temperature of the irradiating location; wherein: a reacted material is produced.

In one aspect, the supplemental concentrator output light pattern is of a spatially reduced light profile relative to the primary concentrator output light profile. In another aspect, the supplemental concentrator is a compound parabolic concentrator and the particle receiver system is a falling particle receiver system. In another aspect, the reacted material enables at least one of thermal energy storage and electricity generation. In another aspect, the particle receiver system further comprises a gas collector configured to collect any gas produced from the reacted material. In another aspect, the cooler encircles the supplemental concentrator and comprises a heat exchange surface. In another aspect, the controller further operates to control a speed of delivery of the working material. In another aspect, the working material is a particle stream comprising a regolith particle stream.

In yet another embodiment, a particle receiver system is disclosed, the system comprising: a system body forming an enclosed volume and configured to receive a primary concentrator light pattern from a primary concentrated light source; a plated body disposed within the enclosed volume and comprising an annular void and configured to receive a cooling fluid inlet and a cooling fluid outlet, the annular void comprising a supplemental concentrator; a particle feed system disposed below an outlet of the supplemental concentrator, the particle feed system conveying particles to the outlet of the supplemental concentrator; and a cooling fluid flowing into the cooling fluid inlet and out from the cooling fluid outlet; wherein the supplemental concentrator receives the primary concentrator light pattern and outputs a supplemental concentrator output light pattern having a spatially reduced light profile relative to the primary concentrator output light profile; and a set of working particles conveyed by the particle feed system are irradiated by the supplemental concentrator output light pattern to yield a reacted material.

In one aspect, the system further comprises a working material feed operating to dispose the working material on a surface of the particle feed system. In another aspect, the system further comprises a controller operating to control at least one of: i) the temperature of the supplemental concentrator, and ii) the temperature of the set of working particles. In another aspect, the supplemental concentrator is a compound parabolic concentrator and the particle receiver system is a falling particle receiver system. In another aspect, the reacted material enables at least one of thermal energy storage and electricity generation.

By way of providing additional background, context, and to further satisfy the written description requirements of 35 U.S.C. § 112, the following set of references are incorporated by reference in entirety for all purposes: U.S. Pat. No. 5,348,696 to Gibson; U.S. Pat. No. 10,793,733 to Shah; U.S. Pat. No. 8,378,280 to Mills; U.S. Pat. Appl. Publ. Nos. 2020/0191443 to Garvey; 2013/0206135 to Ko; 2014/0230807 to von Kries; 2008/0314438 to Cobert; WIPO Pat. Publ. No WO2019/034534 to Dibowski; *SOLAR THERMAL SYSTEM FOR LUNAR ISRU APPLICATIONS: DEVELOPMENT AND FIELD OPERATION AT MAUNA KEA, Hi.* to Nakamura, 49th AIAA Aerospace Sciences Meeting, January 2011; *A MODULAR CERAMIC CAVITY-RECEIVER FOR HIGH-TEMPERATURE HIGH-CONCENTRATION SOLAR APPLICATIONS* to Hischier, Journal of Solar Energy Engineering, 134(1), 2012; *EXPERIMENTAL AND NUMERICAL ANALYSES OF A PRESSURIZED AIR RECEIVER FOR SOLAR-DRIVEN GAS TURBINES* to Hischier, 2012; *OPTICAL ANALYSIS OF VARIABLE APERTURE MECHANISM FOR A SOLAR REACTOR* to Menon, World Academy of Science, Engineering and Technology 59, pgs. 925-9, 2011; and FLUX MEASUREMENT OF A NEW BEAM-DOWN SOLAR CONCENTRATING SYSTEM IN MIYAZAKI FOR DEMONSTRATION OF THERMOCHEMICAL WATER SPLITTING REACTORS to Gokon, Energy Procedia, 49, 2014. The term "regolith" means any blanket of unconsolidated, loose, heterogeneous superficial deposits that covers solid rock, and may include soil, dust, broken rocks, and other related materials. Regolith is present at least on Earth, the Moon, Mars, and some asteroids.

The phrases "working material" and "receiver material" mean any material heated by the supplemental concentrator and may include regolith, granular material, rod, wire, plate, fluid, and any article of any phase of matter or combination of phases of matter.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The disclosed methods and/or systems may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

DETAILED DESCRIPTION

Figure 1:
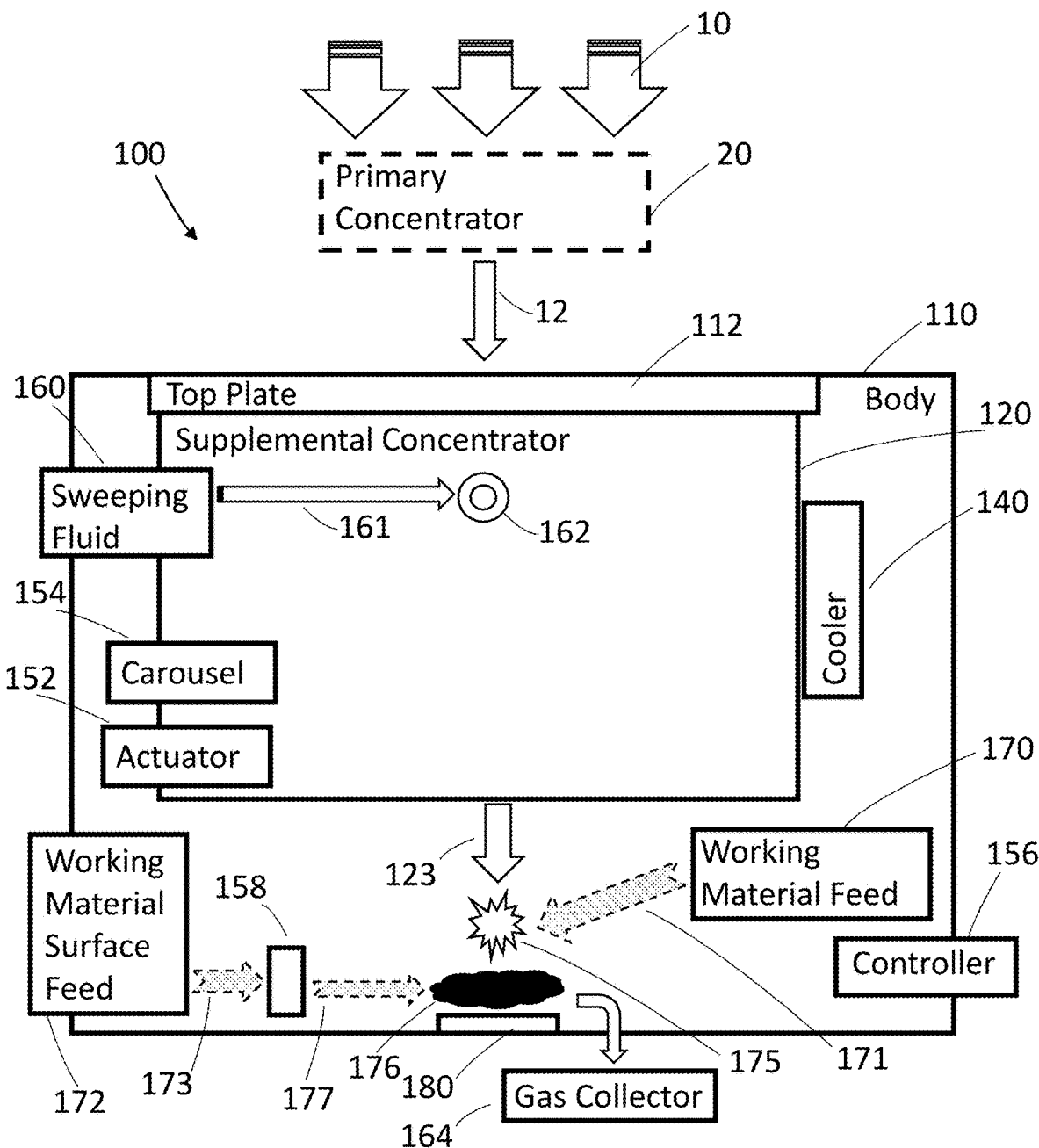
FIG. 1 is a schematic representation of one embodiment of a particle receiver system.

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Most broadly, the disclosure describes a particle receiver system which employs a reflective supplemental concentrator with integrated cooling and associated controls for powering high temperature thermochemical processes using concentrated solar energy. Additional hardware and control methods enable a variety of high temperature processes including thermal energy storage, electricity generation, solar selective melting, selective sintering, calcination of limestone, welding, directed energy deposition, heating of a working material stream, falling particle receiver, biochar reactor, etc.

The disclosed falling particle receiver provides a number of benefits over conventional systems. For example, the system increases solar flux density, modifies a primary concentrator spot into a secondary spot profile providing increased optimality for heating the target mate, and provides an inlet for light to enter an irradiance zone with little chance to be reflected back out through a supplemental concentrator. Additionally, the reflective supplemental concentrator allows the concentrator to be close to the heated material without failing due to melting or thermal shock of the supplemental concentrating optics; its reflective design also reduces efficiency loss due to fouling and avoids thermal runaway if debris collects on the optic as compared to conventional refractive concentrating optic designs. Also, the system thermally and optically isolates heated target from a primary concentrator to protect the primary concentrator optics (e.g., fiber optic bundles). Lastly, the system enables use of less precise primary concentrating optics or a primary solar concentrator with a varying solar flux density distribution output while delivering a consistent secondary concentrated spot profile to a heated target.

In a particular set of embodiments, the disclosure describes a particle receiver system (also referred to as the "system") that provides, for example, selective sintering and melting of lunar regolith using CSE. The end effector is designed to interface with solar collectors through a fiber optic bundle and through free space optical designs such that the outlet of a primary solar concentrator is focused onto the inlet of the end effector. The falling particle receiver system implements an innovative reflective optics design with integrated cooling enabling long-term exposure of the components of the falling particle receiver system to sintering and melting temperatures. Benefits include precise temperature control for consistent sintering, resistance to thermal cracking or damage caused by exposure to very high temperatures as compared to refractive optics, high efficiency optical power transmission across the solar spectrum, supplemental solar concentration of the solar energy transmitted by the primary solar collector, and a system that is lightweight and easily deployed in remote locations, such as the Moon.

The particle receiver system may achieve, among other things: precision temperature control around the receiver material's required processing temperature (e.g., 1,100° C.+/−50° C. for sintering lunar regolith), continuous use at required processing temperatures, and maximizing solar-to-thermal efficiency through testing various prototype designs and process conditions. The particle receiver system has demonstrated sintering and melting of regolith in atmosphere and vacuum conditions, extended heating of a receiver to a temperature of 1,150° C.+/−80.5° C. for 30 minutes, optical transmission efficiency of 82%, and maintaining a steady-state temperature without overheating of the particle receiver system during continuous operation.

The particle receiver system implements a cooling system to prevent failure of the supplemental concentrator during prolonged use and may utilize concentrated solar thermal control technology for delivering and maintaining temperatures to within 1% of a prescribed operating temperature for a wide range of processes including sintering lunar regolith (1,100° C.) and oxygen extraction (≥1,800° C.). For example, in some embodiments aspects of the following references are integrated into the disclosure, the references incorporated by reference in entirety for all purposes: US Pat. Appl. Publ. Nos. 2022/0274077 to Brewer et al and 2022/0268488 to Brewer et al.

The particle receiver system has been developed to interface with multiple concentrated solar sources including, for example, Physical Sciences Inc.'s (PSI's) Solar Energy Module (SEM) with light funneling fiber optic delivery system and the applicant's Fresnel lens based Solar Concentrator Unit (SCU), as described, for example, in OPTICAL WAVEGUIDE SOLAR POWER SYSTEM FOR MATERIAL PROCESSING IN SPACE to Nakamura, Journal of Aerospace Engineering, 28(1), 2015, incorporated by reference in entirety for all purposes. Benefits of the disclosed particle receiver system include precise temperature control for consistent sintering, high transmission efficiency across the spectrum of sunlight by a reflective surface, a hollow body minimizing thermal buildup and end effector mass, passive or active cooling for indefinite exposure to processing temperatures, a more even distribution of output solar flux compared to a single concentrator system, and a scalable system that is lightweight and easily deployed for precision manufacturing and large-scale construction applications alike. Example demonstrated features include: precision temperature control around the sintering temperature of regolith (1,150° C. within +/−80.5° C. of target temperature), sufficient cooling to prevent CPC failure over extended periods of use in a vacuum chamber (e.g., 30 minutes of continuous operation), and maximized efficiency through CPC design and material selection based on thermal simulations of the system.

The particle receiver system is designed to interface with solar collectors through a fiber optic bundle and through free space optical designs such that the outlet of a primary solar concentrator is focused onto the inlet of the end effector.

The disclosed devices, systems, and methods of use will be described with reference to FIGS. 1-7. Generally, systems and methods to provide a particle receiver system and method of use are provided. In one embodiment, a particle receiver system directs sunlight from a primary concentrator into a supplemental concentrating reflective optics where the emitted sunlight is used to heat or sinter materials such as regolith particles at a controlled temperature, the supplemental concentrating reflective optics cooled to prevent, among other things, optical fouling.

Although the disclosed devices, systems, and methods of use will be principally described relative to a particle receiver system to irradiate particles (to include, for example, lunar regolith) for use in additive manufacturing, the devices, systems, and methods of use have other applications. For example, the method and/or devices may be used to facilitate and/or enable thermal energy storage, electricity generation, and high temperature thermochemical processes to irradiate particles such as lunar regolith to produce molten reacted material and/or oxygen. Other applications or uses are possible.

The disclosed devices, systems, and methods of use may be used in concert with that described in U.S. patent application Ser. No. 16/711,566 entitled "Light Concentrator System for Precision Thermal Processes" filed Dec. 12, 2019; and/or 62/910,666 entitled "Apparatus to Produce Agglutinate Simulants" filed Oct. 4, 2019, each of which are incorporated by reference in entirety for all purposes.

The phrase "light pattern" refers to all characteristics of an emitted light, such as brightness, profile angle, color, pixilation, etc. The phrase "light profile" refers to the angle of the emitted cone of light; light profile is one characteristic of a light pattern.

The term "sintering" means the process of forming a solid mass of material by heat without melting the material to the point of liquefaction and may include solid state sintering where no melting occurs or liquid phase sintering where an additive is melted to draw unmelted particles towards one another and bond them together.

The phrase "NASA sintering" means the process of melting <50% of regolith to bond the rest of the unmelted regolith together.

The term "melting" means the process of forming a liquid mass of material by heating a portion or all of the material to the point of liquefaction.

The phrase "additive manufacturing" or "AM" means a process that involves production of a component through successive additions of layers, which is the opposite of traditional subtractive manufacturing, where parts and pieces are removed during construction of a product.

Figure 2A:
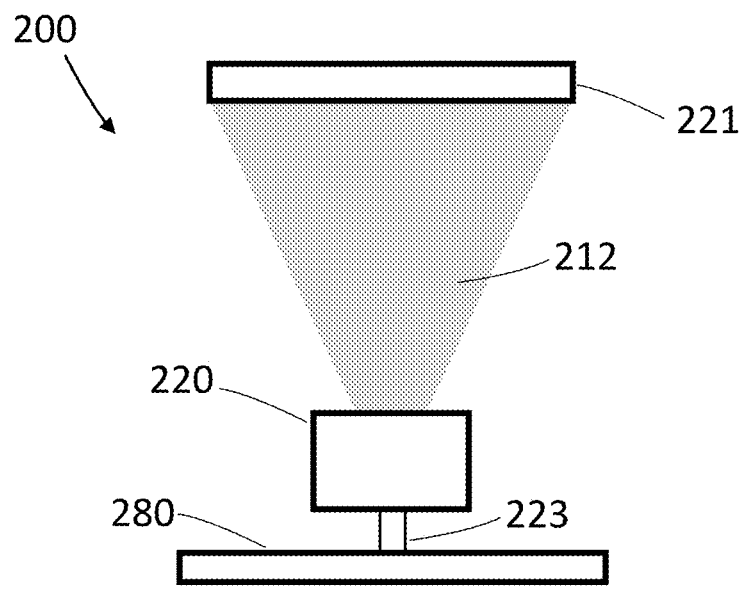
FIG. 2A is a schematic representation of another embodiment of a particle receiver system, the embodiment engaged with a direct primary concentrator.
Figure 2B:
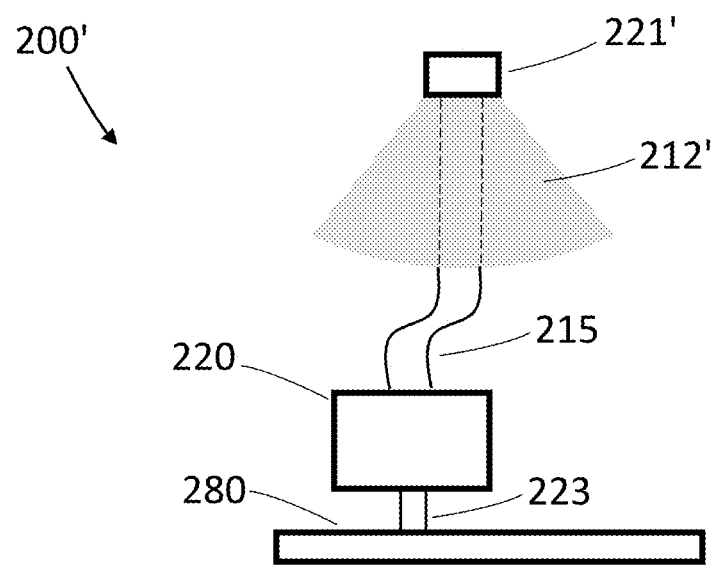
FIG. 2B is a schematic representation of another embodiment of a particle receiver system, the embodiment engaged with an indirect primary concentrator.
Figure 3:
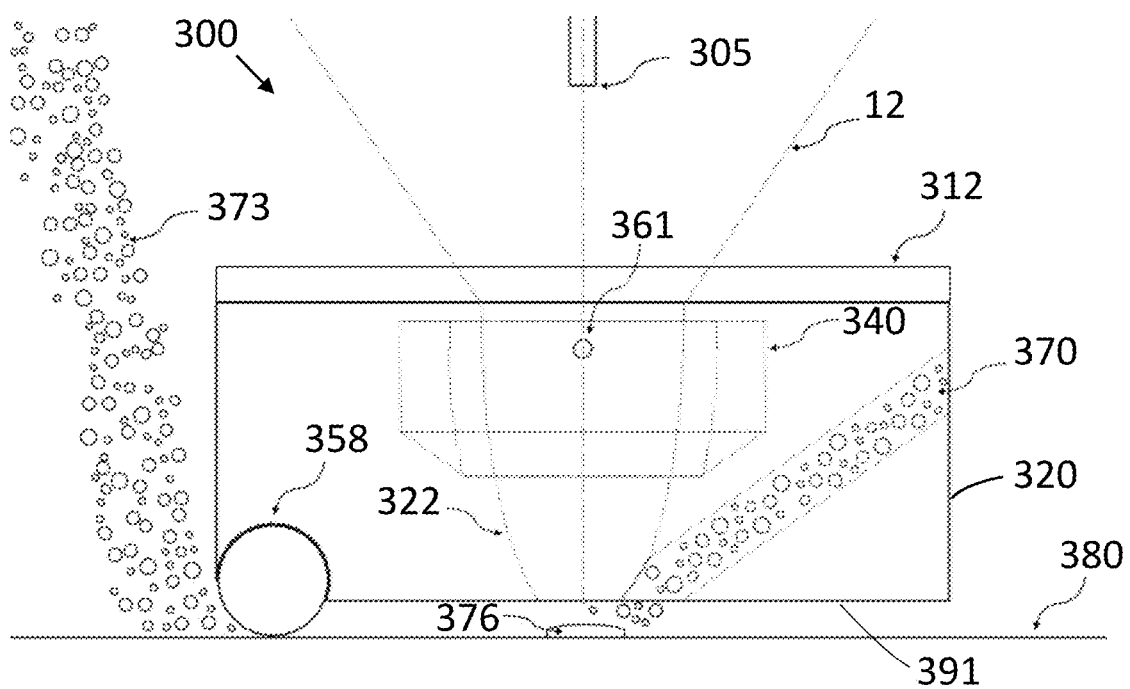
FIG. 3 is a schematic representation of another embodiment of particle receiver system, the embodiment directed to an additive manufacturing application.
Figure 4:
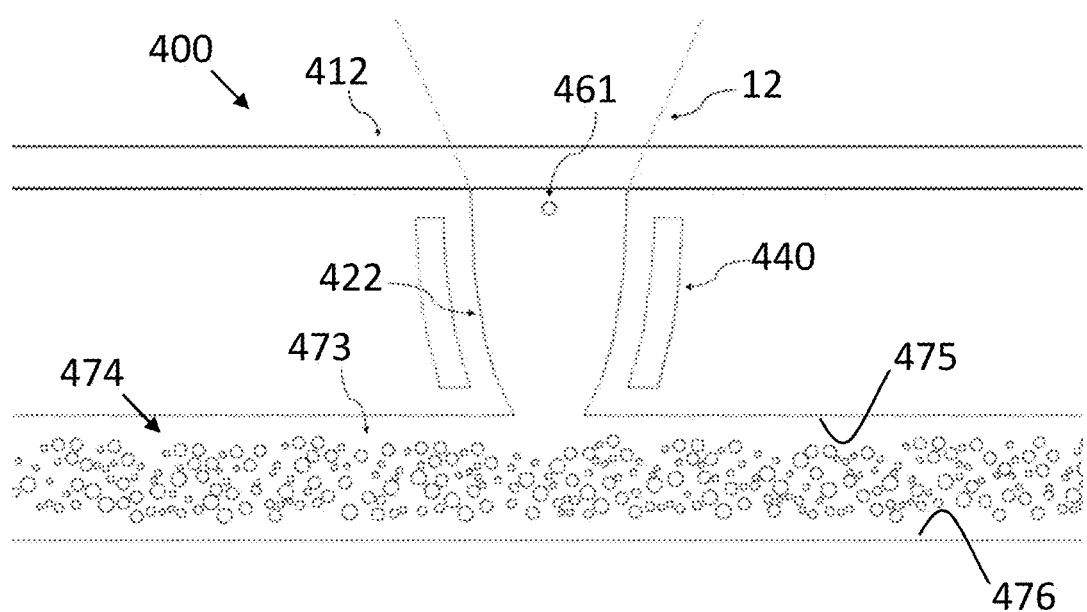
FIG. 4 is a schematic representation of another embodiment of a particle receiver system, the embodiment directed to a solar thermal reactor design application.
Figure 5:
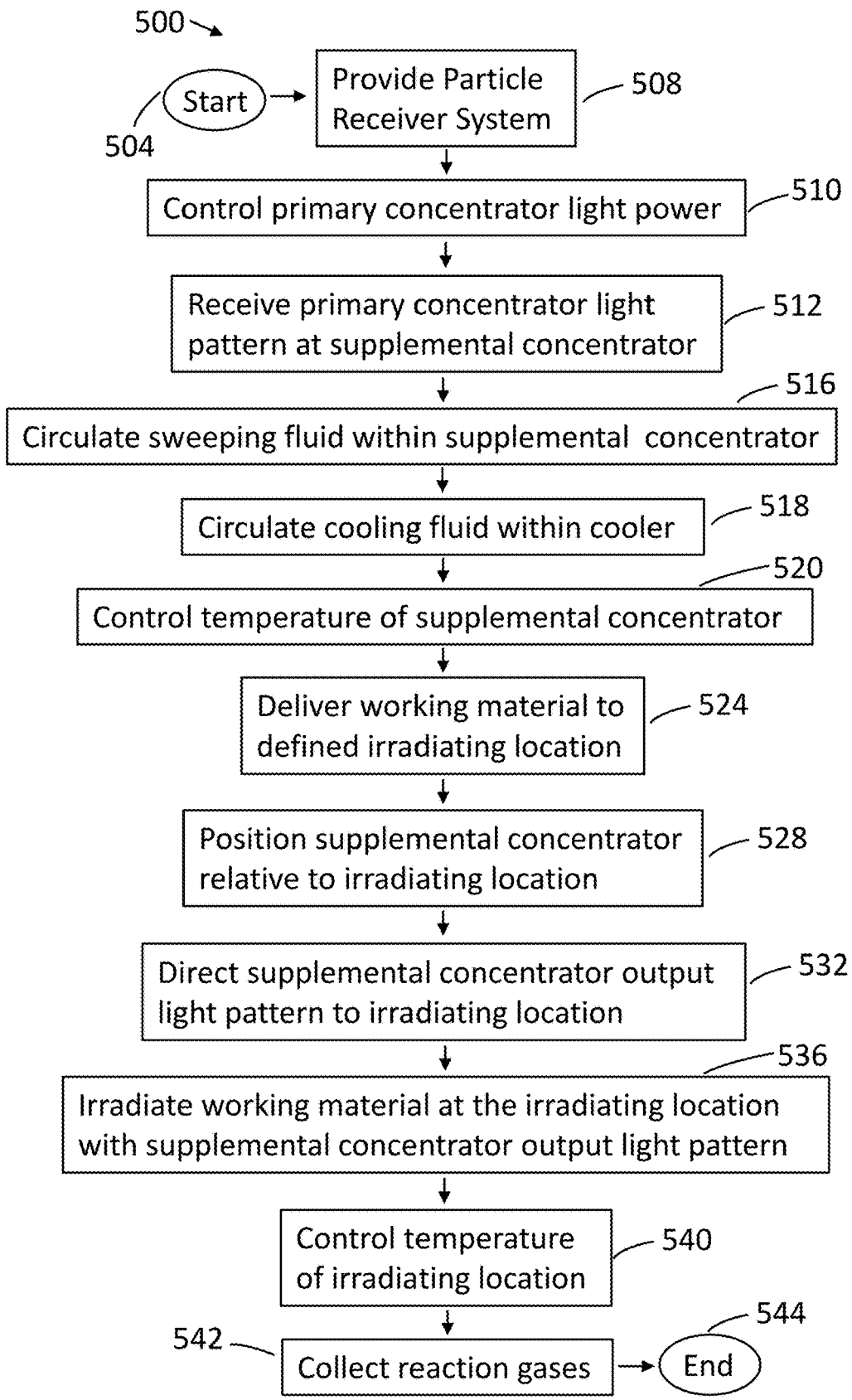
FIG. 5 is a flow chart of a method of use of the particle receiver system of FIG. 1.
Figure 6A:
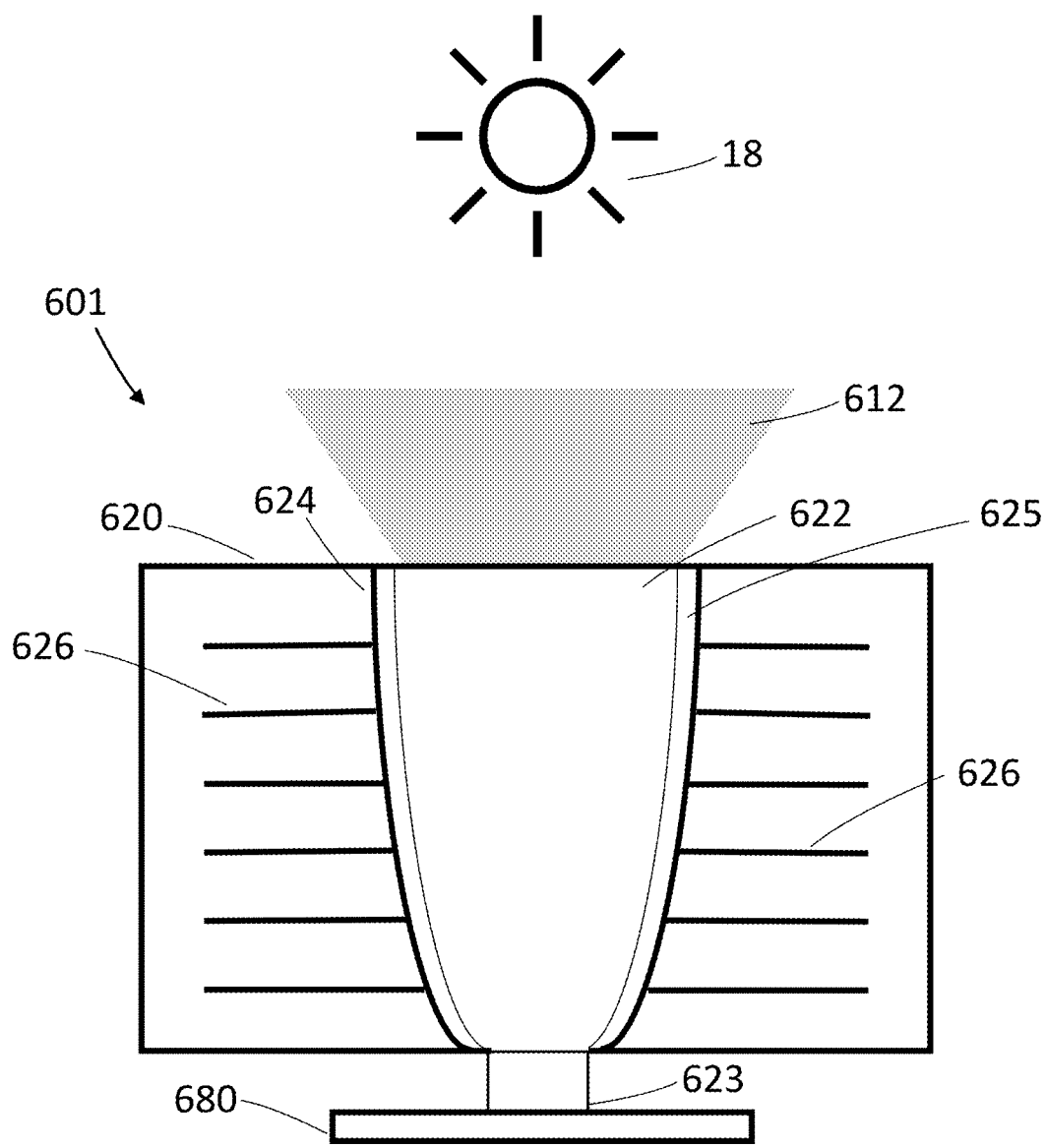
FIG. 6A provides one embodiment of a cooling subsystem for a supplemental concentrator of a particle receiver system, the cooling features forming a passive radiator fin cooling system.
Figure 6B:
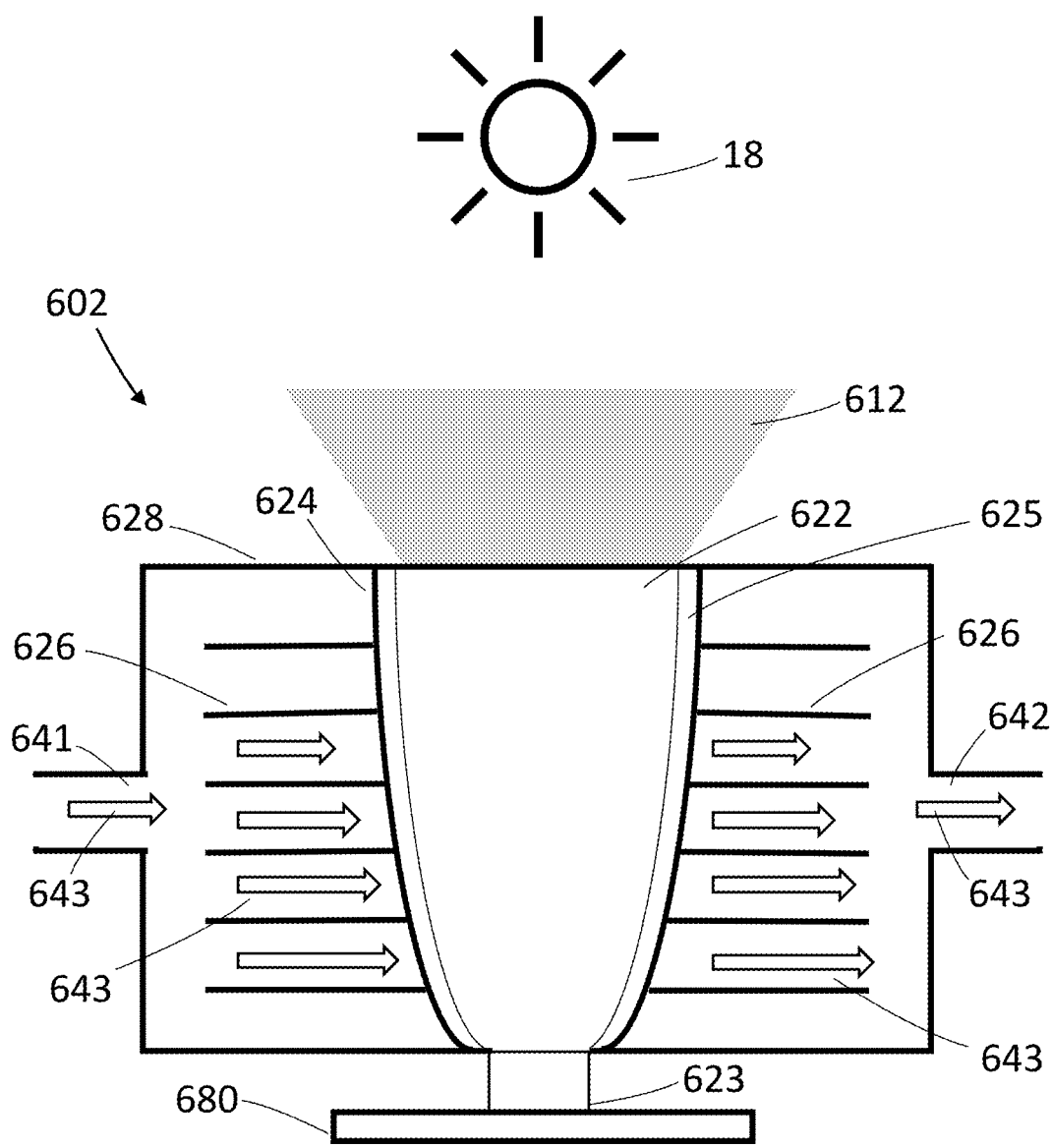
FIG. 6B provides another embodiment of a cooling subsystem for a supplemental concentrator of a particle receiver system, the cooling features forming a convectively cooled heatsink system.
Figure 6C:
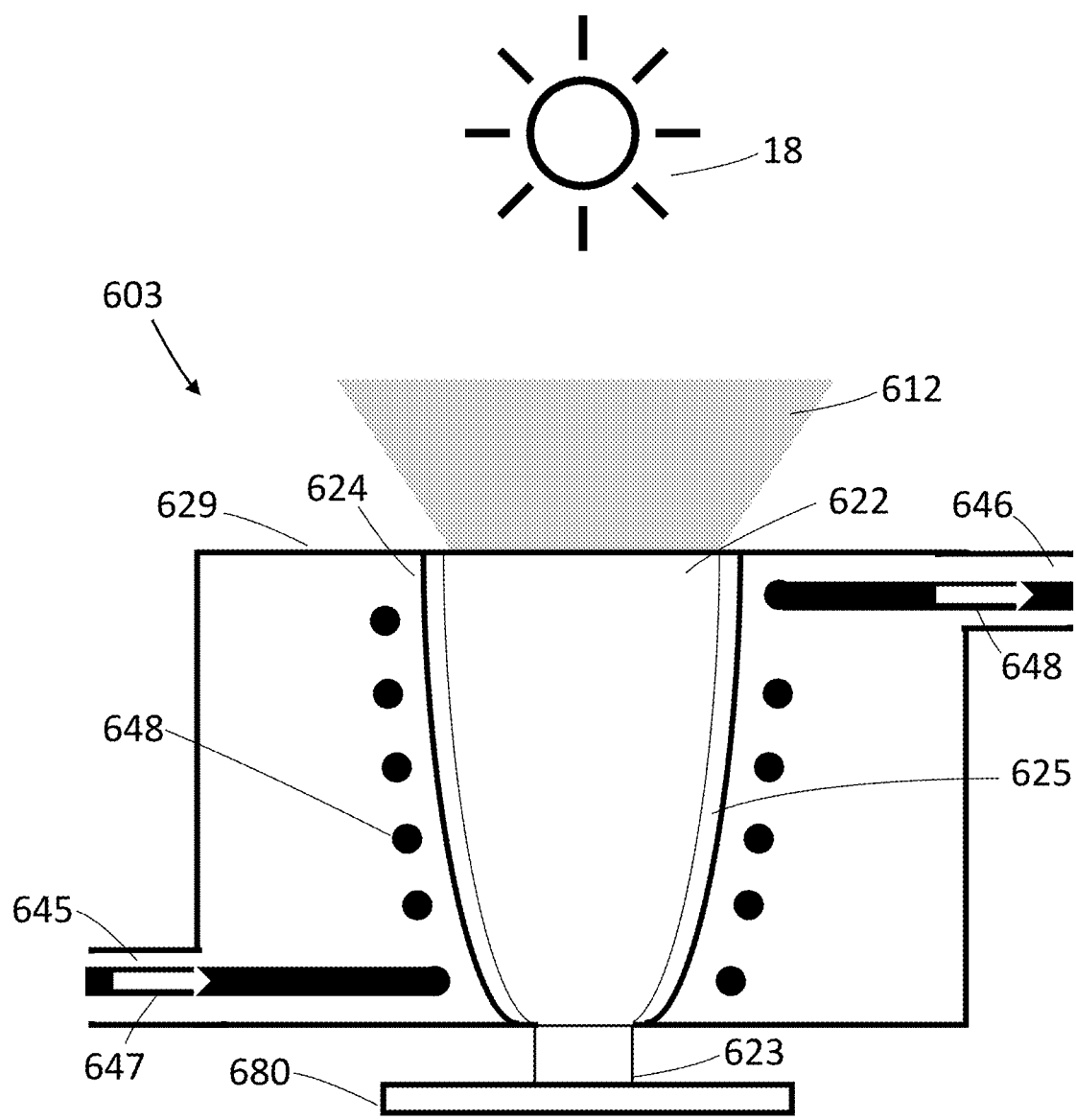
FIG. 6C provides yet another embodiment of a cooling subsystem for a supplemental concentrator of a particle receiver system, the cooling features forming an active internal channel cooling system.
Figure 7A:
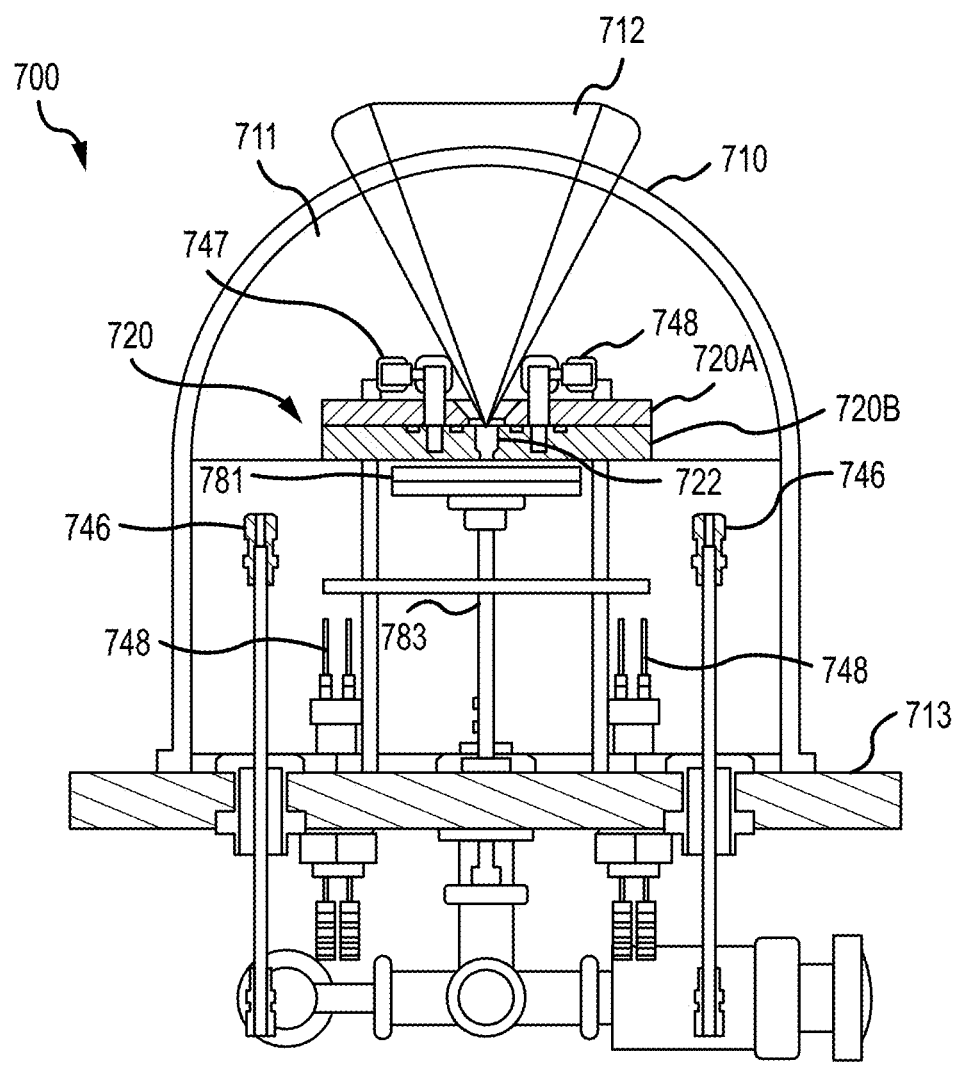
FIG. 7A provides a side cutaway view of a prototype embodiment of a supplemental concentrator and particle receiver system.
Figure 7B:
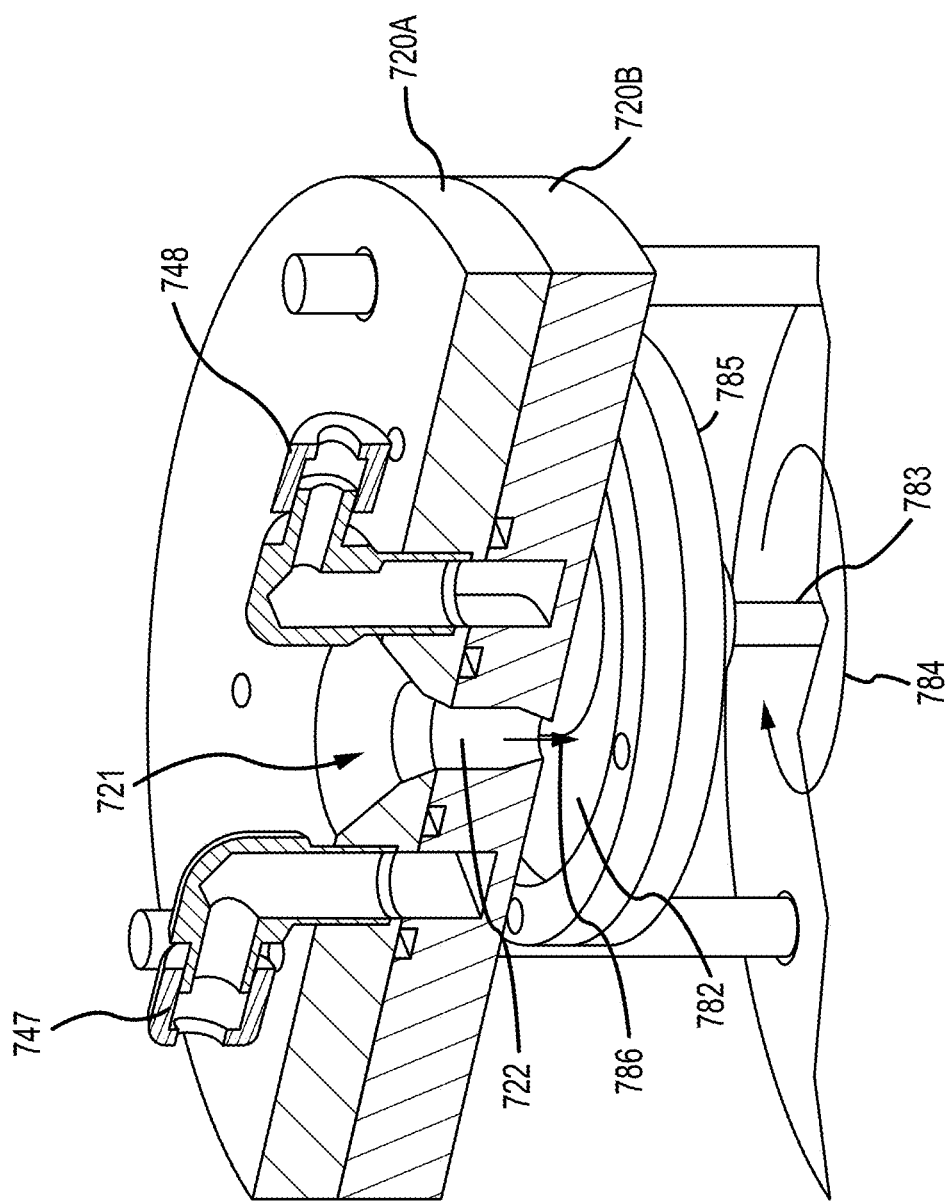
FIG. 7B presents a detail cutaway perspective view of portions of the particle receiver system embodiment of FIG. 7A, to include the rotating particle tray (carousel) component and the supplemental concentrator plated body component.

FIG. 1 is a schematic representation of one embodiment of a particle receiver system 100. FIG. 2A is a schematic representation of another embodiment of a particle receiver system 200, the embodiment engaged with a direct primary concentrator 220. FIG. 2B is a schematic representation of the embodiment of a particle receiver system 200, the embodiment engaged with an indirect primary concentrator 220'. FIG. 3 is a schematic representation of another embodiment of a particle receiver system 300, the embodiment directed to an additive manufacturing application. FIG. 4 is a schematic representation of another embodiment of a particle receiver system 400, the embodiment directed to a continuous material processing application. FIG. 5 is a flow chart of a method of use of the particle receiver system 100 of FIG. 1. FIGS. 6A-C depict particle receiver system designs showing various embodiments of cooling features for the supplemental concentrator. FIGS. 7A-B depict another embodiment of a particle receiver, the embodiment a prototype embodiment with described experimental results.

Components and features of the disclosed sintering end effector system will now be described with respect to FIGS. 1-7.

With attention to FIG. 1, one embodiment of a particle receiver system 100 is described. Most generally, the particle receiver system 100 comprises a supplemental concentrator 120, a sweeping fluid device 160, a cooler 140, an actuator 152, a working material feed 170 (in one embodiment, the working material is regolith), and a controller 156. The particle receiver system 100 receives solar energy or sunlight from a primary concentrator 20 and uses or applies that sunlight to irradiate a working (aka receiver) material (such as regolith particles) to yield or produce a reacted material (in one embodiment, the reacted material is a molten reacted material). The particle receiver system 100 may further comprise a body 110, top plate 112, gas collector 164, working material (such as, e.g., regolith) surface feed 172 device, and a surface preparer 158 device.

The supplemental concentrator 120 receives a primary concentrator light pattern 12 from primary concentrator 20 and outputs a supplemental concentrator light pattern 123, the supplemental concentrator 120 comprising reflective optics. In some embodiments, the supplemental concentrator 120 is a CPC. The supplemental concentrator output light pattern 123 is of a different optical character than the primary concentrator light pattern 12. For example, the supplemental concentrator output light pattern 123 more concentrated, narrower, more focused, and/or of a reduced light profile relative to the primary concentrator output light profile 12. The primary concentrator output light profile 12 may pass through a transparent top plate 112 prior to receipt by the supplemental concentrator 120. The body 110 engages with or couples to one or more of the top plate 112, the cooler 140, carousel 154, actuator 152, and sweeping gas 160 device.

The primary concentrator light pattern 12 has a primary concentrator light profile aka a first light profile. The supplemental concentrator output light pattern 123 has a second light profile. The second light profile of the supplemental concentrator output light pattern 123 is of a different optical character than the first light profile of the primary concentrator light pattern 12. In one embodiment, the second light profile is a spatially reduced light profile relative to the first light profile. In one embodiment, the second light profile is a geometrically reduced light profile relative to the first light profile. The phrases "spatially reduced light profile" and "geometrically reduced light profile" mean a light pattern that has relatively less or reduced optical span, such as a reduced or tightened optical light cone.

The supplemental concentrator output light pattern 123 having a second light profile is of increased solar flux relative to the primary concentrator light pattern 12 having a first light profile. Stated another way, the second light profile is of increased solar flux relative to the first light profile. The sweeping fluid device 160 provides a circulating feed of fluid comprising input stream 161 within the supplemental concentrator 120 to cool the supplemental concentrator 120 and/or to heat the fluid (see FIGS. 6A-C as to cooling features of the particle receiver). The cooler 140 directs the circulating feed of fluid near or adjacent to the supplemental concentrator 120 by way of one or more fluid inlet/outlets (again, as described in FIGS. 6A-C). The term "fluid" means a substance devoid of shape that yields to external pressure, to include liquids and gases and combinations of liquids and gases. In one embodiment, water is used as the sweeping fluid. In one embodiment, argon is used as the sweeping fluid. In one embodiment, any inert gas is used as the sweeping fluid. In one embodiment, methane is used as the sweeping fluid with the methane facilitating a thermochemical reaction within the working (aka receiver) material.

In one embodiment, the cooler 140 encircles the supplemental concentrator 120 and comprises a set of radiator fins (and/or manifolds) configured to direct the cooling fluid at least along an exterior surface of the supplemental concentrator 120 (see, e.g., FIGS. 6A-C). The controller 156 operates to control the characteristics (e.g., pressure, flow rate, incoming temperature) of the circulating feed of fluid to maintain a selectable temperature for the supplemental concentrator 120. In one configuration of the cooler 140, the cooler (alone or as configured with radiator fins) acts to cool the outside of the CPC by radiation alone (such as, for example, when operating in space) without a heat transfer fluid.

In one embodiment, a fluid is configured to flow within the CPC filling or partially filling the volume contained within the volume of the CPC to increase optical efficiency through total internal reflectance. As a specific, non-limiting example, a fluid such as dielectric fluid may fill the inside of the CPC such that light is transmitted to the outlet through total internal reflectance within the fluid. Among other things, such a configuration enables or generates an optical efficiency increase as, for example, the outside of the fluid which is in contact with the mirrored reflector redirects the light before the light has a chance to reflect off the mirrored surface where there is some chance the light will be absorbed by the mirrored surface.

In one embodiment, the cooler 140 operates independently with the sweeping fluid gas device 160. In one embodiment, the sweeping fluid gas device 160 operates independently of the cooler 140.

More generally, the cooler system 140 acts on the outside of the CPC while the sweeping fluid device 160 acts on the inside of the CPC, except in some embodiments in which the cooling fluid and sweeping fluid are one and the same and combined as a single fluid stream.

The actuator 152, controlled by the controller 156, operates to position the supplemental concentrator 120 relative to an irradiating location 175. The actuator 152 may control one or more of vertical (z) position and horizontal (x, y) position of the supplemental concentrator 120 and output angle of the supplemental concentrator output light pattern 123 relative to a receiver, such as a print bed 180.

The actuator 152 may, in concert with controller 156, adjust or position one or more components, such as optical components, positioned between primary concentrator 20 and the supplemental concentrator 120. Such components would generally receive and operate on primary concentrator light pattern 12. As an example, a mechanical iris and/or an occluding plate with orifice may be positioned between primary concentrator 20 and the supplemental concentrator 120 and adjusted by the actuator 152 via control by controller 156. Such a subsystem of actuator 152, controller 156, and additional or supplemental components, such as optical components, may form an optical power control subsystem of the particle receiver system 100. Other components, to include optical components such as optical filters, optical lens, occluding plates, orifice plates, and the like as known to those skilled in the art, may be positioned between primary concentrator 20 and the supplemental concentrator 120 and positioned or adjusted by the actuator 152 and/or controller 156. For example, in one embodiment, a mechanical iris is positioned between primary concentrator 20 and the supplemental concentrator 120 to enable or assist with temperature control of the supplemental concentrator 120.

The actuator 152 may, in concert with controller 156, adjust or position one or more components, such as optical components, at or near the irradiating location 175 to provide, for example, optical spot profile control. Stated another way, by way of example, a mechanical iris and/or an orifice plate, as actuated or positioned by the actuator 152 in concert with the controller 156, may provide optical spot profile control of a light pattern directed at the irradiating location 175. Such additional optical component(s) may or may not work in optical concert with the secondary concentrator 120. Note that the supplemental optical components described (e.g., optical filters, optical lens, occluding plates, orifice plates, the like as known to those skilled in the art) may be positioned at one or more locations in the system 100 to influence or change one or more the light patterns of the system, to include the primary concentrator light pattern 12 and the supplemental concentrator output light pattern 123. The irradiating location 175 is the location at which irradiation of the working material occurs through interaction with or energization from the supplemental concentrator output light pattern 123. The supplemental concentrator output light pattern 123 is emitted from a lower or bottom portion of the supplemental concentrator 120 (at a port or outlet) and is, in many embodiments, emitted directly downwards from the supplemental concentrator in a plane perpendicular to a lower surface of the supplemental concentrator and in a plane perpendicular to a targeted surface (e.g., print bed 180 surface). Although the supplemental concentrator output light pattern 123 emission is fixed relative to the lower surface of the supplemental concentrator 120, the supplemental concentrator output light pattern 123 emission may be selectably adjusted in energy pattern (e.g., focus) with respect to distance away from the supplemental concentrator output light port, or may shift horizontally with angle of the lower surface of the supplemental concentrator 120 (as adjusted by way of the actuator 152 in concert with controller 156). In one embodiment, the irradiating location 175 is immediately below or adjacent a supplemental concentrator 120 outlet or port.

The working material feed 170 operates to deliver a working material stream 171 to an irradiating location 175. In some embodiments the working material stream is a stream of particles such as regolith particles. In one embodiment, a fixed particle surface is provided, and the supplemental concentrator moves over the fixed particle surface when irradiating the particles. In one embodiment, particles are conveyed inwards towards the irradiating zone beneath the supplemental concentrator outlet.

The working material feed 170 may be configured in any of several ways. In one embodiment, the working material feed 170 is configured to deliver or convey material or particles through the center of the supplemental concentrator 120 at one or more locations about a longitudinal centerline of the supplemental concentrator 120. In another embodiment, the working material feed 170 is configured to deliver or convey material or particles in a radially inward manner 120 at one or more locations about a longitudinal centerline of the supplemental concentrator 120, to include at or near or adjacent the supplemental concentrator 120 outlet. In one embodiment, the working material feed 170 is delivered or conveyed along a longitudinal centerline of the supplemental concentrator 120. Note that working material feed 170 may start at ambient temperature, which is typically cooler than the supplemental concentrator 120. By feeding the working material on the outside of the supplemental concentrator 120, the working material is heated up (i.e., the working material is "preheated" because of getting heated more in the irradiation location) while also serving to cool the supplemental concentrator 120. In some embodiments, this heat exchange between the outside wall of the supplemental concentrator 120 and the working material works best if the particles are being conveyed in a fluid to help with conduction between CPC wall and particles.

The supplemental concentrator output light pattern 123 irradiates the working material stream at the irradiating location 175 to create a feedstock melt pool 176 and/or yield a reacted material. In one embodiment, reacted material is a molten reacted material.

The controller 156 may control system-level parameters of the particle receiver system 100 and/or one or more components or subsystems of the particle receiver system 100. For example, the controller 156 may control the internal temperature of the body 110 of the particle receiver system 100, the temperature of the supplemental concentrator 120, the actuator 156 (as described above), and/or the temperature of the irradiating location such as the feedstock melting pool 176. In one embodiment, the controller 156 receives one or more measurements from one or more sensors so as to control and/or monitor a system, subsystem, or component parameters. For example, the controller 156 may receive a measure of solar irradiance from a solar irradiance sensor and provide the value to a system user and/or use the measurement as a control input to control the temperature of the system (e.g., the internal temperature of body 110) by way of the cooler 140. (Note that the phrase "solar irradiance" means the power per unit area received from the Sun in the form of electromagnetic radiation in the wavelength range of the measuring instrument.) As another example, the controller 156 may monitor and/or control, with aid of a temperature sensor, the temperature and/or phase change of the working material associated with the irradiating location 175.

A gas collector 164 collects gases emitted during the irradiation of the working material aka receiver material, such as any gas produced from a molten reacted material.

The particle receiver system 100 further comprises a carousel 154 configured to replace one or more components of the supplemental concentrator 120, to include, in some embodiments, the entire supplemental concentrator 120. In some embodiments, reflective optic elements may be housed within the carousel to replace or resurface the reflective surface within the supplemental concentrator. Stated another way, the relatively thin reflective optic may be intermittently replaced should the optic become dirtied or damaged; the replacements are housed within the carousel.

The working material surface feed 172 device provides an output feed or stream of working material 173 to surface preparer device 158 which in turn outputs a processed output feed 177 that is positioned near or adjacent or within the irradiation location 175. The irradiation location 175 may be located below the supplemental concentrator 120, as depicted in FIG. 1. In one embodiment, the irradiation location 175 is below a longitudinal centerline of the supplemental concentrator 120. In one embodiment, the irradiation location 175 is located within the supplemental concentrator 120. In one embodiment, the irradiation location 175 is located within and below the supplemental concentrator 120.

In one embodiment, the processed output feed 177 is a compacted and smoothed layer of particles such as regolith. FIG. 3 described below depicts a specific embodiment of the particle receiver system 300 using both a regolith feed 370 and a surface preparer 358 device.

The various embodiments of a particle receiver system may engage with any of several types of primary concentrators known to those skilled in the art. For example, the particle receiver system 200 of FIG. 2A is depicted engaging with a direct primary concentrator 221, and the particle receiver 200' of FIG. 2B is depicted engaging with an indirect primary concentrator 221' (requiring the use of a fiber optic bundle 215). More specifically, the particle receiver system 200 of FIG. 2A is optically engaged with direct primary concentrator 221, the direct primary concentrator 220 producing primary concentrator light pattern 212 which enters particle receiver body 220, in turn producing supplemental concentrator output light pattern 223 that is directed at print bed 280. Similarly, the particle receiver system 200' of FIG. 2B is optically engaged with indirect primary concentrator 221', the indirect primary concentrator 221' producing primary concentrator light pattern 212' which enters particle receiver body 220, in turn producing supplemental concentrator output light pattern 223 that is directed at print bed 280.

The output light profile of the particle receiver system may be applied to many different high temperature material processes. FIG. 3 is a schematic representation of another embodiment of a particle receiver system 300, the embodiment directed to additive manufacturing applications. The particle receiver system 300 comprises a supplemental concentrator body 320 disposed below a transparent top plate 312, encircled by cooler 340, and in fluid communication with sweeping gas carried within gas inlet/outlet 361. The supplemental concentrator optic 322 (here, a CPC) contained within the supplemental concentrator body 320 receives primary concentrator light pattern 12 from a primary concentrator (not shown). A monitoring sensor 305 is positioned within or adjacent the primary concentrator light pattern 12 to sense or measure, e.g., a temperature of the primary concentrator light pattern 12. A working material feed 370 deposits the working material or receiver material within or adjacent an irradiation location below the supplemental concentrator which yields, upon irradiation of the working materials (in one embodiment, regolith particles) by the supplemental concentrator output light pattern, a molten material 376. A working material feedstock stream 373 is provided to or adjacent a surface preparer 358 which processes the feedstock stream, the processed feedstock stream in turn irradiated by the supplemental concentrator output light pattern (as either moved to the irradiation location or irradiated by the supplemental concentrator optic 322 output light pattern as directed by a controller controlling one or more actuators that move the supplemental concentrator optic 322 and/or supplemental concentrator body 320 so as to direct the supplemental concentrator optic 322 output light pattern to the processed feedstock stream). The lower surface of the body of the falling particle receiver system 300 comprises a effective surface 391 which adds to solar-to-thermal efficiency and reduces cooling power requirements.

FIG. 4 is a schematic representation of another embodiment of a particle receiver system 400, the embodiment directed to a (working) receiver material heating application (such as that described in, e.g., the afore-cited U.S. Pat. Appl. No. 63/153,571 entitled "Solar Concentrator Reactor for High Temperature Thermochemical Processes" filed Feb. 25, 2021). Note that this embodiment also describes aspects of a particle system 400 involving a fluidized bed particle receiver or a particle stream entrained within a fluid flow being conveyed through a pipe or tube.

The particle receiver system 400 comprises a supplemental concentrator optic 422 and cooler 440 disposed below a top plate 412, one or both of the supplemental concentrator optic 422 and cooler 440 in fluid communication with a sweeping gas carried within gas inlet/outlet 461. The supplemental concentrator optic 422 receives a primary concentrator light pattern 12 from a primary concentrator (not shown). A working material feed 473 deposits the working material aka receiver material within or adjacent an irradiation location below the supplemental concentrator optic 422 in a channel 474. The working material feed 473 is irradiated by the supplemental concentrator 420 output light pattern. The channel 474 may have a first internal channel surface 475 that is a reflective surface and a second internal channel surface 476 that is a reflective surface. The reflective surfaces 474, 475 add to solar-to-thermal efficiency and reduce cooling power requirements. In one embodiment, the channel 474 may be an enclosed channel such that there is only one internal surface and the first internal channel surface 475 and the second internal channel surface 476 are the same surface. In one embodiment, the channel 474 may be a reflective solar concentrator.

Note that in some embodiments of the particle receiver system of the disclosure, the system may receive an input light pattern (via a primary concentrator) from sources other than or in addition to the sun, such as any available solar power, laser, microwave, or electromagnetic radiative energy source known to those skilled in the art.

In some embodiments, a plurality of primary concentrators may be employed or engaged. Such a set of primary concentrators are configured so as to provide one or more primary concentrator light patterns to the supplemental concentrator. In some embodiments, one or more primary concentrators may be coupled (such as optically coupled) with a redirecting mirror and/or an additional aka ancillary concentrator prior to (that is, optically upstream) the supplemental concentrator inlet.

Note that in many embodiments of the particle receiver system of the disclosure, the supplemental concentrator takes the form of a CPC although many different shapes of concentrating optic may be used as known to those skilled in the art. The inlet and outlet of the supplemental concentrator may be oriented parallel to the target surface, oriented at an angle not parallel to the target surface, or oriented at varying angles relative to the target surface. The reflective optic may be cooled by a radiator and/or by cooling fluid moving through cooling channels integrated into the housing of the reflective optic, or by other means known to those skilled in the art.

Additional hardware components may be used to facilitate various thermochemical processes. These optional components include but are not limited to: 1) an airflow system to pass an inert gas or reactant gas past the reflective optics for, e.g., preventing product gases and ejected material from fouling the supplemental concentrator optics, 2) a reflective surface above the heated surface to reflect radiated light from the target away from the concentrating optic and back onto the target surface, 3) a system for dispensing the working material near the heated spot, such as a flow of particles through an annular void surrounding the reflective optic, 4) a shutter or filter before the inlet of the supplemental concentrator for controlling power passing into (and therefore through) the supplemental concentrator, 5) a non-contact sensor for measuring temperature, detecting phase transitions of heated material, and/or analyzing chemical products at the irradiation spot, 6) a chamber for controlling cooling rate of the feedstock material after it has been heated, such as when annealing a glass product, 7) hardware for mounting a fiber optic bundle to the inlet of the supplemental concentrator, 8) a redirecting mirror and translating primary concentrator for enabling the supplemental concentrator to be translated across a surface while still receiving at its inlet consistent solar flux density and power transmitted from the primary solar collector, 9) a system for preheating a gas and/or granular feedstock in a chamber surrounding the supplemental concentrator while also acting to cool the optic, 10) a system for shaping, contouring, and/or compacting granular feedstock prior to it being heated, 110) a system for feeding wire or rod through the heated spot for solar welding, and wire, rod, or powder for solar directed energy deposition, 12) hardware for cleaning the supplemental concentrator including pneumatic blowers, mechanical brushes, electrostatic discharges, and dispensers of CO2 ice or other sublimating ice, 13) hardware for intermittently replacing the supplemental concentrator such as through a motorized carousel, 14) an outlet gas port or compressor pump near the heated spot to collect reaction gases or gas products from the heated feedstock, and 15) a configuration option consisting of an array of reflective supplemental concentrators composing a multi-head tool allowing system scaleup.

Also, components of the particle receiver systems of the disclosure may include and be alternatively or additionally be described as follows:

1) Reflective supplemental concentrator with integrated cooling in the housing of the concentrator and/or channels for heat transfer to a feedstock or reactant gas to prevent overheating of the optic.
2) Mechanism for sweeping gas across the reflective secondary solar concentrator to prevent fouling and potentially aid in a thermochemical reaction at the heated spot. This flow of gas may be produced via pumps, fans, and blowers, or by natural convection pulling air through the open inlet of the supplemental concentrator.
3) Hardware to feed material in front of or at the heated spot, including elements for shaping and compacting the target surface prior to heating. Feedstock deposition with optional compaction enables selective solar melting and selective solar sintering additive manufacturing processes, while conveying material into the heated spot or molten pool enables solar powered directed energy deposition.
4) Actuator(s) for distancing the supplemental concentrator closer or farther from the heated target. Distancing of the supplemental concentrator from the target adjusts spot size projected onto a target surface and, when coupled with a temperature sensor or digital camera, may be used to control temperature of the target.
5) Motorized carousel for replacing reflective optics of the supplemental solar concentrators after fouling has occurred.
6) Control system to adjust translation speed, distance of supplemental concentrator to target, and optical power transmitted into the supplemental concentrator
7) Reflective supplemental concentrator mounted to the end of an optical waveguide or fiber optic bundle to enable additional concentration and avoid fouling or thermal damage to the refractive optics
8) Reactant gas collection system near the heated spot for applications such as oxygen extraction from regolith.
9) An array of reflective supplemental concentrators and associated hardware for multi-headed operation and system scaleup.

FIG. 5 is a flow chart of a method of use 500 of the particle receiver systems described above, such as the embodiment of the particle receiver system of FIG. 1. Note that some steps of the method 500 may be added, deleted, and/or combined. The steps are notionally followed in increasing numerical sequence, although, in some embodiments, some steps may be omitted, some steps added, and the steps may follow other than increasing numerical order. Any of the steps, functions, and operations discussed herein can be performed continuously and automatically. The method starts at step 504 and ends at step 544.

After starting at step 504, the method 500 proceeds to step 508. At step 508, a particle receiver system is provided. The particle receiver system may be any of the embodiments described above or below, or combinations thereof. After completing step 508, the method 500 proceeds to step 510.

At step 510, the light power emitted or supplied from the primary concentrator is controlled by the controller so that the light power is received by the supplemental concentrator in a defined and known manner with defined and known characteristics. In some embodiments, the light power emitted or supplied from the primary concentrator passes through a filter and/or shutter (or other optical element) which assists if not enables the controller to control the light power from the primary concentrator. After completing step 510, the method 500 proceeds to step 512.

At step 512, the supplemental concentrator receives a primary concentrator light pattern from a primary concentrator. The primary concentrator may be, e.g., a direct or indirect primary concentrator, as described respectively in FIGS. 2A and 2B. After completing step 512, the method 500 proceeds to step 516.

At step 516, sweeping fluid, as provided by a sweeping fluid device, is circulated within the supplemental concentrator. The sweeping gas is controlled by a controller. The sweeping fluid, among other things, serves to prevent fouling of optics of the supplemental concentrator. In one embodiment, the sweeping fluid of the sweeping device engages with or is in fluid communication with a cooler device. After completing step 516, the method proceeds to step 518.

At step 518, cooling fluid associated with the cooler is circulated within the cooler. The circulation of the cooling fluid, among other things, serves to prevent overheating of the optics of the supplemental concentrator. After completing step 518, the method proceeds to step 520.

At step 520, the temperature of the supplemental concentrator is controlled by the controller. The controller may use one or more of conditions of the sweeping gas supply (e.g., temperature, pressure, type of gas, etc.) and/or conditions of the cooler (e.g., positions orientations, routing, etc. of mechanical aspects of the cooler such as vanes, radiator panels) to control the temperature. After completing step 520, the method proceeds to step 524.

At step 524, working material is delivered, by way of the working material feed, to a defined irradiating location. After completing step 524, the method proceeds to step 528.

At step 528, the controller operates or controls the actuator to position the supplemental concentrator relative to the irradiating location. For example, the actuator may move the supplemental concentrator in a vertical plane such that a lower surface of the supplemental concentrator adjusts distance relative to the material exit from the working material feed. After completing step 528, the method proceeds to step 532.

At step 532, the controller translates the supplemental concentrator output light pattern relative to the working surface or material stream. For example, the controller may adjust, by way of the actuator, the supplemental concentrator position in a plane parallel to the receiving plane such that the emitted supplemental concentrator light pattern intersects with the working material feed at a set distance from an exit from the working material feed device. (Note that either the delivered working material could be moved to an irradiating location near or adjacent the secondary output light pattern or the irradiating location could be moved to the working material). After completing step 532, the method proceeds to step 536.

At step 536, the supplemental concentrator output light pattern irradiates the working material with the supplemental concentrator output light pattern. (Note that more generally, the irradiation (and its associated reaction(s)) may occur, in some embodiments, with as minimal contact as possible between the hardware elements of the particle feed system and the particles, such as heating the particles in flight or at the surface of particles atop a fluidized bed or vibratory conveyor.) After completing step 536, the method proceeds to step 540.

At step 540, the temperature of the irradiating location is controlled by the controller. After completing step 540, the method 500 proceeds to step 542.

At step 542, any reaction gases are collected, the reaction gases a result of irradiating the working material. At the completion of step 542, the method proceeds to step 544 and the method 500 ends.

FIGS. 6A-C provide a series of three embodiments of a cooling subsystem for a supplemental concentrator of a falling particle receiver system, the supplemental concentrator configured as a CPC.

A CPC is a non-imaging optic utilizing a parabolic shape and internal reflection to deliver maximum light concentration per the Conservation of Etendue principle. The revolved parabolic surface efficiently concentrates light from a wide range of acceptance angles down to a small spot at its outlet. This is achieved with high thermodynamic efficiency by a single reflection of any given ray of light within the CPC's functional acceptance angle ($\theta$). Any light outside of this acceptance angle gets reflected multiple times and is rejected back out of the CPC inlet. Incidentally, the shape of the parabolic surface also mixes and redistributes the incoming light rays to produce an even distribution of radiant flux at the outlet. Unlike a single spot concentrator which produces a gaussian distribution of output radiant flux, a CPC can be used for more even heating of a target surface to produce a more uniform temperature across the concentrated spot. This even distribution of output solar flux is a primary benefit of using a CPC as a supplemental concentrator in a particle receiver system used for sintering and processing regolith with concentrated sunlight.

CPCs are defined by input diameter, output diameter, and acceptance angle (maximum angle that light passes through the CPC), which together dictate the overall maximum concentration ratio. The acceptance angle determines the CPC's concentration ratio through the relationship $C=1/\sin 2(\theta)$. Acceptance angles larger than 45° force the maximum concentration to rapidly approach zero. On the other side, concentration ratios above 50 start to produce unrealistic geometry and operating conditions. Concentration ratios below 5 are good targets for the SEER if used with a primary concentrator as redistribution of light for even heating is a more critical factor in sintering applications than enhanced concentration by the end effector. As with all optics, CPCs come in two common varieties: refractive (solid transparent body), and reflective (hollow mirrored surface). A refractive optic can be made from many materials including single crystal oxides such as yttria-stabilized zirconia, yttrium aluminum garnet, magnesium oxide, and sapphire, with sapphire showing the best thermal shock resistance. However, regardless of the material, refractive optics are difficult to cool in long duration applications and suffer from vapor deposition of off-gasses onto their surface. This aspect was highlighted by Salem et al. (2009) where two sapphire refractive CPCs failed at 1,300° C. and 649° C. when subjected to concentrated solar energy. The study, done at NASA's Glenn Research Center, concluded that the CPCs failed mainly due to design flaws during machining and large temperature variations within the CPC. The primary benefit of a reflective CPC compared to the refractive CPC is that it minimizes thermal absorption by the optic since light does not need to pass through the body of the CPC.

While the design principals for both types of CPCs are the same, the process by which they are manufactured are quite different. Solid CPCs are typically made through casting or subtractive machining and require post-process polishing for each unit. Hollow CPCs are typically made from metal and do not require post process polishing of every unit if produced via electroforming. Electroforming is the most prominent process for making hollow CPCs because it is significantly easier to produce a mirror finish on the inner surface of a hollow CPC compared to traditional, subtractive-based fabrication. Electroforming is an electrolytic process which deposits a thin metal layer of nickel or copper onto a polished master tool to grow metal substrates. This electroformed metal is then separated from the tool. The tool is stainless steel, chrome finished, optically polished, and can be used to create duplicates of the design at minimal additional cost. In order to optimize the CPC for a particular waveband, the inner surface of the base is electroplated with gold or other reflective materials. In order to transmit as much of the solar spectrum as possible with most of the sun's spectral flux between 400-700 nm, silver is an ideal choice for the reflecting surface (up to 95% reflectance for wavelengths above 400 nm).

The particle receiver system may sustain large temperature swings between operation during the terrestrial or lunar day and night. These swings can distort the CPC geometry whose precision is critical to its functionality. In order to address this issue, the coefficient of thermal expansion (CTE) of the CPC must be taken into account. For example, a copper CPC body with silver coating optimizes performance based on reflectance and thermal conductivity (385-406 W/m*K) but each material's CTE ($17-18*10-6/°$ C.) could pose a problem. A tungsten CPC body would have the lowest CTE possible ($4.3*10-6/°$ C.) with decent thermal conductivity (173 W/m*K) and a rhodium coating would provide a significantly lower CTE than silver ($8.5*10-6/°$ C.) with decent thermal conductivity (151 W/m*K), but significantly less reflectance (75-80% across solar spectrum).

One major benefit of using the disclosed particle receiver compared to conventional approaches are two-fold: 1) the system will more evenly distribute output solar flux at the working surface compared to fiber optics or single concentrators, and 2) the system will reduce thermal absorption by the optic of light from both the primary concentrator and from the working surface, while enabling efficient cooling from its outer surface in order to prevent failure or melting during prolonged use.

Thermal management, whether passive or active, is an important feature for enabling the use of a CPC in a particle receiver system. While passive cooling is more attractive for use on the Moon by avoiding the need for heat transfer fluids, active cooling may handle higher thermal loads and is practical for use on Earth. For this reason, it is important to develop embodiments of the falling particle receiver with both passive and active cooling subsystems for the CPC.

A set of three embodiments of cooling subsystems of a particle receiver system are provided in each of FIGS. 6A-C. The cooling subsystems provide thermal management of the supplemental concentrator element (such as a CPC supplemental concentrator) of a particle receiver system. Generally, the supplemental concentrator element is cooled by direct coupling with a radiator (FIGS. 6A and 6B) or through heat pipes (FIG. 6C) positioned adjacent the secondary concentrator. FIG. 6A provides one embodiment of a cooling subsystem for a supplemental concentrator of a particle receiver system 601, the cooling features forming a passive radiator fin cooling system. The falling particle receiver system 601 comprises supplemental concentrator body 620 which receives primary concentrator output light profile 612, such as produced from sun 18. The supplemental concentrator body 620 comprises supplemental concentrator optic 622 (a CPC), supplemental concentrator sleeve 624 which conformally surrounds the exterior of the supplemental concentrator optic 622, and thermal grease 625 which also conformally surrounds the supplemental concentrator optic 622 and fits between the exterior of the supplemental concentrator optic 622 and the supplemental concentrator sleeve 624. Extending outwards from the supplemental concentrator sleeve 624 are a set of radiator fins 626. The radiator fins, formed of any known thermal radiation materials such as various metals and alloys, conductively remove thermal energy e.g., heat from the supplemental concentrator sleeve 624, the supplemental concentrator sleeve 624 receiving thermal energy e.g., heat from the supplemental concentrator optic 622. The phrase "thermal grease" means any material known to those skilled in the art used to increase thermal contact conductance across jointed solid surfaces and may include various silicone thermal interface materials. The supplemental concentrator body 620 outputs a supplemental concentrator output light pattern 623 received by print bed 680.

The passive radiator fin design presented in FIG. 6A is ideal for use on the Moon because it enables a simple, efficient way of heat wicking that does not require a cooling fluid, which is expensive to launch from Earth. (See, for example, OPTICAL WAVEGUIDE SOLAR POWER SYSTEM FOR MATERIAL PROCESSING IN SPACE to Nakamura, Journal of Aerospace Engineering, 28(1), 2015, incorporated by reference in entirety for all purposes.) Rejeb recently explored an optimized design for passively cooling concentrated photovoltaics (CPV) subjected to solar concentration ratios up to 10,000×. (See NOVEL SOLAR PV/THERMAL COLLECTOR DESIGN FOR THE ENHANCEMENT OF THERMAL AND ELECTRICAL PERFORMANCES. Renewable energy, 146, 2020, incorporated by reference in entirety for all purposes.) Rejeb et al concluded that by coupling copper, alumina, and aluminum to form a heat sink, it is possible to passively cool the photovoltaic down to permissible operating temperatures. The study shows that passively cooling a CPC optic exposed to CSE is feasible because a metal CPC may withstand much higher temperatures than conventional and current photovoltaics. Notionally, the passive functionality may be optimized through fin design (number of fins, thickness, geometry, orientation), material selection, and the addition of a radiating heat sink to further increase the radiative surface area for wicking heat to space.

While a passive cooling system may be ideal in some operating conditions, active cooling may be required in other operating conditions to, for example, maintain the thermal load on the CPC considering the high operating temperatures and energy flux associated with CSE. Two active cooling systems are provided in FIGS. 6B-C.

In FIG. 6B, a precision machined metal sleeve 624 the supplemental concentrator optic 622 in place and makes intimate contact with the outer surface of the supplemental concentrator optic 622 for optimal heat transfer. The supplemental concentrator sleeve 624 is mounted to a set of radiator fins 626 of a radiator body that is actively cooled by flowing a cooling fluid 643 across the set of radiator fins 626. The radiator fins 626 transfer heat from the supplemental concentrator optic 622 to the cooling fluid 643 as the fluid flows past. The cooling features of the particle receiver system 602 of FIG. 6B form a convectively cooled heatsink system.

Toward providing additional description, the particle receiver system 602 of FIG. 6B comprises supplemental concentrator body 628 which receives primary concentrator output light profile 612, such as produced from sun 18. The supplemental concentrator body 628 comprises supplemental concentrator optic 622 (a CPC), supplemental concentrator sleeve 624 which conformally surrounds the exterior of the supplemental concentrator optic 622, and thermal grease 625 which also conformally surrounds the supplemental concentrator optic 622 and fits between the exterior of the supplemental concentrator optic 622 and the supplemental concentrator sleeve 624. Extending outwards from the supplemental concentrator sleeve 624 are a set of radiator fins 626. The radiator fins, formed of any known thermal radiation materials such as various metals and alloys, remove thermal energy e.g., heat from the supplemental concentrator sleeve 624, the supplemental concentrator sleeve 624 receiving thermal energy e.g., heat from the supplemental concentrator optic 622. Cooling fluid 643 enters supplemental concentrator body 628 at inlet 641 and exits at outlet 642. The cooling fluid 643 also receives thermal energy e.g., heat from the supplemental concentrator optic 622.

In FIG. 6C, a relatively more compact and, in some operating conditions, a more efficient sleeve and body design is depicted. The embodiment of FIG. 6C may be additively manufactured as a single piece with internal fluid channels built in, providing relatively more control over fluid flow. (Note that additive manufacturing techniques, such as 3D printing, may be used to produce all or some of the elements or component elements of the various embodiments of particle receiver systems disclosed herein.). The phrases "additive manufacturing" and "3D printing" mean the process manufacturing objects from 3D model data through the repeated addition of small amounts of material, usually layer upon layer.

The falling particle receiver system 603 of FIG. 6C comprises supplemental concentrator body 629 which receives primary concentrator output light profile 612, such as produced from Sun. The supplemental concentrator body 629 comprises supplemental concentrator optic 622 (a CPC), supplemental concentrator sleeve 624 which conformally surrounds the exterior of the supplemental concentrator optic 622, and thermal grease 625 which also conformally surrounds the supplemental concentrator optic 622 and fits between the exterior of the supplemental concentrator optic 622 and the supplemental concentrator sleeve 624. Positioned adjacent and forming a circular pattern around the exterior of the supplemental concentrator optic 622 are internal fluid channels 648. Cooling fluid 647 enters supplemental concentrator body 629 at inlet 645, flows through the internal fluid channels 648, and exits through outlet 646. The cooling fluid 647 receives thermal energy e.g., heat from the supplemental concentrator optic 622

The conventional or prior art designs of particle receiver systems are incomplete and problematic.

For example, Physical Sciences Inc. (PSI) developed an optical waveguide solar power system that focuses light from multiple concentrators into a quartz rod. The quartz rod serves as an end effector transferring the high intensity solar radiation from seven optical fiber cables onto a regolith surface. One benefit of PSI's end-effector is the ability to sinter a large area of regolith at a time however, the system does not provide temperature control.

Another end-effector technology that has been explored is through the use of heat pipes to collect and transfer incident solar radiation heat from a primary concentrator. The benefit of using a heat pipe is that solar energy may be incident upon the pipe at acceptance angles up to 90°. However, the drawbacks include transmission losses when using solar to heat a fluid that then heats the regolith. Also, the pipe must be in direct contact with the regolith to heat it, so material buildup and corrosion appear on the pipe after prolonged use. NASA's Glenn Research Center (GRC) developed a secondary CPC concentrator for propulsion applications in the late 1990s through the "Shooting Star" flight experiment. This Dielectric Total Internal Reflecting Concentrator (DTIRC) was thought to be a more efficient supplemental concentrator compared to hollow reflective CPCs and not require a cooling system, but both prototypes failed during testing due to temperature variations through the component.

The disclosed system addresses these drawbacks by providing an end-effector aka particle receiver that is able to control process temperatures, mitigate thermal buildup through the end effector with a cooling system, and avoid risks of corrosion since hardware won't be in contact with regolith.

Also, the disclosed particle receiver system takes advantage of a recent discoveries by the authors which explored the material melting power of a single concentrator system compared to a dual concentrator system utilizing a CPC as the supplemental concentrator. These tests demonstrated that the single concentrator system may transmit enough solar flux to sinter and melt materials ranging from glass to ruthenium (sintered, 2300° C. melting temperature), while secondary aka supplemental concentration with a CPC produced higher maximum temperatures at the working surface (sintered molybdenum, 2600° C. melting temperature) and faster heating rates. One of the key discoveries regarding secondary concentration and end effector design is that glass CPCs are difficult to work with because they absorb a lot of energy and melt within 30 s of use unless positioned far enough away from the working surface, which rapidly diminishes its effectiveness. This demonstrates a critical need for innovative thermal mitigation strategies when using a CPC as a supplemental concentrator (or end effector). By using a hollow, reflective CPC rather than solid glass or quartz end effector options, thermal buildup within the optic is minimized and further mitigated with active cooling.

CSE has been demonstrated as a heat source for sintering processes and may greatly enhance infrastructure development activities on the Moon as an abundant and free energy source for thermal applications. The primary solar concentrator for the disclosed particle receiver system could take several forms including the Solar Energy Module (SEM) developed by PSI that utilizes a series of parabolic mirrors to focus light into fiber optic bundles for CSE delivery. The primary benefit of PSI's SEM is the freedom to deliver CSE to any point at any orientation independent of the concentrating lenses. The downfall of PSI's module is its low, 33% optical efficiency, losing 66% of the CSE through the process.

In one embodiment, the disclosure's primary concentrator uses a Fresnel lens primary solar concentrator to apply solar energy directly at the focal position maximizing efficiency (up to 92% optical efficiency) while minimizing weight and complexity, but limits CSE delivery to the focal length of the primary concentrator. External to the primary concentrator, the disclosed particle receiver has an estimated 92% optical efficiency (up to 95% with a protected silver coated reflective surface), resulting in overall transmission efficiencies of 30.4% and 85% with PSI's and the disclosure's concentrator systems respectively.

Many solar concentrators have been designed that may utilize the disclosed particle receiver system and/or its components or subsystems, including heliostat arrays, parabolic mirrors, and Fresnel lenses. The best concentrator for a given design will depend on the spacecraft, launch limitations, and operating requirements. Fresnel lenses may be optimal for solar thermal applications on the Moon because they can be made of polycarbonate to minimize weight or optical silicone for thermal stability across greater ranges in operating temperature. Thin planar optics like Fresnel lenses may deliver high light concentration ratios while minimizing weight and volume for compact stowage and may be designed to inflate or unroll for space deployment.

The author's concentrator and thermal control system was developed using a Fresnel lens, making it a natural choice for the disclosed particle receiver system. However, the concentrator system operates in a similar fashion using a parabolic reflector or any other concentrator developed specifically for use on the Moon. The concentrator system may also incorporate thermal control technology (as described in the afore-mentioned U.S. Ser. No. 16/711,566) that utilizes a shutter system and variable lens distance with active feedback control for delivering and maintaining specific processing temperatures. This technology demonstrated heating of powders to temperatures greater than 2,600° C., precision control over the temperature of a working surface to within ±1% of the set temperature, improved material heating with a CPC supplemental concentrator (higher temperatures and faster heat rates) and produced 2D sintered shapes out of regolith simulant.

Furthermore, the overall concentration ratio of the particle receiver system may be estimated based on the size of the testing lens and observed concentrated spot. The author's primary concentrator had a concentration ratio of 5,994 while the supplemental concentrator had a concentration ratio of 5. Using these values for the particle receiver system, the solar concentrating system has a combined concentration ratio of 27,092 when the CPC is in use and a max estimated temperature of 2,600° C., well over the required 1,100° C. for sintering lunar regolith. These demonstrations act as an initial proof of concept for solar 3D printing and manufacturing on the Moon using local resources.

The temperature control technology may be maintained by a louver shutter mechanism that covers a portion of the Fresnel lens to control the total power transmitted through the lens and onto the working surface at any given time. The working material temperature is monitored using a non-contact pyrometer and this temperature reading is used to dictate the shutter position in a multi-input, multi-output (MIMO) feedback control system that enables precise temperature control as well as accurate tracking of the sun.

Temperature control demonstrations were made using the afore described primary concentrator and louver shutter mechanism. A shutter mechanism is incorporated into the particle receiver system to enable its use on other concentration systems like PSI's fiber optic system. A servo-controlled iris shutter mechanism with metal or graphite petals may be implemented immediately above the CPC inlet to limit the amount of light passing through the system, thus controlling the power output and temperature of the working material. An iris shutter mechanism demonstrated the ability to limit solar flux being applied to a working material. For optimal transmission efficiency, the primary concentrator may be sized to meet the energy requirements for sintering regolith, enabling the shutter mechanism to remain and unrestrictive of the incoming solar flux open while maintaining a 1,100° C. operating temperature.

An optical modeling tool may be used to model heat transfer in a CPC and working material based on incoming light from the primary concentrator. Such a model includes heat transfer through conduction, convection, radiation, solar absorption within the CPC, surface transmission, and reflectance. Variables that may be investigated with the model include CPC properties (reflectance, acceptance angle, and material), gap between CPC inlet and working material, spot diameter transmitted onto the working material, incoming direct solar irradiance, and shutter level or aperture area. The code was modified to incorporate optical ray tracing for optimizing the CPC design. The model was expanded to incorporate hollow CPC and cooling system geometries for evaluating and optimizing different cooling system designs and mechanisms (passive radiative cooling vs active convective cooling). The following design parameters were explored: CPC acceptance angle vs concentration ratio fit for two different primary concentrators, overall size and its effect on power transmission and temperature increase of the concentrating optics, material selection and its effect on transmission efficiency based on reflectance, material selection and its effect on thermal conductivity through the optic, cooling system geometries and fluid flow around the CPC body for various fluid properties. The model estimated temperature buildup in the CPC and estimated cooling system requirements for three different cooling system designs (flow rates required to prevent overheating, fluid density, and fluid temperature).

In one embodiment, a CPC has a 26.56 deg. acceptance angle. There are significant tradeoffs between different surface coatings which include reflectance at wavelengths across the solar spectrum, thermal conductivity, and melting temperature. From an analysis of reflective coatings, Rhodium presented an ideal choice for its relatively high reflectance at longer wavelengths of light, high thermal conductivity of 150 W/m-K, and high melting temperature of 1,960° C. Other possible materials include aluminum for its high reflectance and very high thermal conductivity, and silver which provides an excellent mix of very high reflectance, thermal conductivity, and melting temperature.

FIGS. 7A-B depict a particular protype embodiment of a particle receiver system 700. The particle receiver was physically constructed and evaluated. Some components or subsystems of the particle receiver system 700 were constructed of multiple configurations or designs. Generally, FIG. 7A presents a side cutaway view of the entire falling particle receiver system 700, and FIG. 7B presents a detail or close-up cutaway perspective view of portions of the particle receiver system 700 of FIG. 7A, to include a rotating particle tray conveying the working material and the supplemental concentrator plated body component.

(Note that the protype embodiment of a particle receiver system 700 describes one of many particular embodiments of the disclosed particle receiver system. Other embodiments provide alternate configurations to irradiate particles. For example, the supplemental concentrator may be moved relative to the particles, the particles may be conveyed below the concentrator via a vibratory tray or fluidized particle feed, or the particles may be feed radially inwards through an annular feed moving particles into the irradiating zone. The later configuration comprises a circular trough with the same central axis as the concentrator that feeds particles inwards uniformly from all sides. The circular trough may be configured with a cylindrical wall rotating about a fixed auger with a hollow inner diameter, thereby raising particles up the auger blades through motion of the rotating outer wall until the particles reach the top of the auger at which point, the particles fall inwards through the irradiating zone and down through the center of the hollow, non-rotating auger). The particle receiver system 700 comprises system body 710 forming an enclosed volume 711, supplemental concentrator plated body 720 comprising an upper plate 720A and lower plate 720B, rotating particle tray 785 operating about rotating particle tray shaft 783, and cooling fluid inlet 747 and cooling fluid outlet 748.

In the case of the machined Aluminum CPC and housing, Integrated cooling is incorporated into the particle receiver system 700 through an annular void surrounding a supplemental concentrator, implemented as a CPC 722. For manufacturability, portions of the protype embodiment of a particle receiver system 700 are manufactured of machined aluminum. Specifically, the supplemental concentrator plated body 720 is manufactured of machined aluminum and comprises upper plate 720A for seating gaskets between the two plates with a cooling fluid inlet 747 and a cooling fluid outlet 748 to access the annular void 721, and a lower plate 720B configured to receive or position the machined CPC 722. Cooling fluid enters and exits the annular void by way of the respective cooling fluid inlet 747 and cooling fluid outlet 748.

Concentrated solar energy 712 enters the particle receiver 700 at upper portion and is received at upper portion of annular void 721 within upper plate 720A, the concentrated solar energy 712 continuing to CPC 722. The CPC 722 emits a CPC output light pattern 786.

The CPC 722 surfaces machined into the aluminum lower plate 720B is polished to a mirror finish. The surface of the lower plate 720B facing the particles positioned on a particle tray surface 782 of the particle tray 781 is also polished to a mirror to reduce heating of components of the particle receiver 700 by reflecting light that is radiated and reflected from the particles.

The particle tray 785 rotates about particle tray shaft 783 in a tray rotation direction 784. Particles are positioned on particle tray surface 782 so as to receive a CPC output light pattern 786. The particles are irradiated by the CPC output light pattern 786. In one embodiment, the particle tray 785 is manufactured of machined aluminum. The enclosed volume (aka chamber) 711 forms a vacuum. The upper transparent bell-shaped portion of the system body 710 is a Pyrex bell jar and the lower flat baseplate 713 is a one-inch-thick aluminum baseplate as shown in FIGS. 7A-B. This vacuum configuration was designed to demonstrate particle (e.g., regolith) sintering/melting and perform characterization tests at pressures of between roughly 1 and 10 mTorr. Such conditions reduce heat transfer by natural convection to a negligible degree and allow observation of the process of sintering and melting of particles in the absence of air. Multiple feedthroughs (746, 747) were incorporated into the baseplate 713 for the cooling fluid inlet 747 and cooling fluid outlet 748, a rotating particle tray shaft 783 within the chamber 711, four thermocouple leads 748 for monitoring temperature at various locations within the chamber, and a vacuum outlet. Note that fluid connections between the feedthroughs 746, 747 and respective cooling fluid inlet 747 and cooling fluid outlet 748 are not shown for increased clarity. The particle tray 720 mounts on the powered rotating particle shaft 783 to allow controlled scan speeds of particles beneath the outlet of the CPC 722. The particle receiver system 700 was fabricated and tested under varying operating conditions both in open air and in vacuum tests with pressures down to 10 mTorr. Demonstration tests were performed on lunar Highlands regolith simulants where the particle receiver system 700 was interfaced with a Fresnel lens primary concentrator to evaluate the process conditions necessary for bonding regolith into a cohesive structure for applications ranging from additive construction of landing pads and habitats to additive manufacturing of small-scale mechanical components. The process conditions evaluated included transmitted solar power, scan speed, scan strategy, hatch spacing, regolith simulant type, pre-compaction of regolith, absolute pressure, distance between CPC 722 outlet and particle tray surface 782, and re-visit time when repeatedly exposing a localized portion of regolith to CSE. The results of these tests indicated that the particle receiver system 700 was able to quickly and efficiently bond regolith through localized melting of all or a portion of the regolith surface. In the case of partial melting, unmelted regolith grains were found to be entrained within and bonded by the melted portions of regolith to form a glass matrix while requiring relatively low CSE. The particle receiver system 700 performed well in these tests with no indication of permanent deformation or failure. These developments mark a dramatic improvement over conventional systems for secondary solar concentrators and/or CSE end effectors placed near a target surface that are heated to high temperatures of greater than 1,000° C. The use of a reflective CPC and integrated cooling in the particle receiver system 700 enabled long periods of continuous operation unlike conventional systems attempting to achieve secondary solar concentration near the heated target.

The particle receiver system 700 was mounted to rotate with a primary concentrator such that the incoming CSE entered from the top of the bell jar and remained in line with the inlet of the CPC 722 regardless of solar elevation angle.

A total of three standalone particle receiver system 700 systems were assembled. This included system 700 mounted to a mini-SCU with optical power output near 70 W. An x, y translation tray was mounted below the system 700 for translating regolith past the CPC outlet. In this configuration, the primary concentrator rotated independently of the system 700 while the system's 700 bottom plate and regolith surface remained parallel with a constant gap between the two.

The second standalone system consisted of a particle receiver system 700 mounted in the much larger SCU with an x, y translation tray placed beneath. In this configuration, the system 700 and the translation tray rotated along with the lens arms such that the system inlet and regolith surface remained in line with the primary concentrator as it tracked the sun.

The third system that was assembled and instrumented was the vacuum chamber containing the particle receiver system 700 and a rotating tray of regolith. The configuration of the system again placed the inlet of the CPC 722 in line with the primary concentrator by rotating the chamber with the rotation of the lens arms.

Experimental Results

Six days of regolith sintering and melting tests showed no indication of failure or thermal damage to the particle receiver system 700 over more than 5 hours of operation. This demonstrated a significant improvement over conventional systems for CSE heating of a target surface to high temperatures (>1,000° C.) when using a secondary solar concentrator placed near the surface (e.g., FAILURE ANALYSIS OF SAPPHIRE REFRACTIVE SECONDARY CONCENTRATORS to Salem, No. E-17063, 2009, incorporated by reference in entirety for all purposes).

Initial demonstration testing was performed using the mini-SCU with the system 700 and an x, y translating bed. Lunar Highlands simulant LHS-1 produced by Exolith Lab was used in these tests and was loaded into individual sample trays for achieving varying depths of regolith prior to testing. Translation speed tests were then run at full power of approximately 70 W transmitted from the primary solar collector. Discoloration of the regolith was observed following exposure to CSE transmitted by the CPC 722 and some melting was observed at the slowest speeds. Condensation was observed on the elements of the system 700 and all subsequent tests were run with a cooling fluid inlet temperature greater than the dew point to reduce this effect for open air tests. A thermocouple was placed at the outlet of the system 700 for the 26.56° acceptance angle CPC and temperatures of up to 1,300° C. were recorded. A power meter was placed at the outlet and a maximum of 26 W of optical power was measured passing through the system 700 in this configuration. Due to the low wattage from the small-scale primary collector (~70 W) and minimal melting observed during these tests, all subsequent demonstration testing was conducted using the much larger full-sized SCU with roughly 8× the optical power output from the primary concentrator as compared to the mini-SCU.

A wide range of open-air demonstration tests were conducted over several days using the system 700 integrated with the SCU, initially with LHS-1 and later with CSM-LHT-1. These tests explored the effects of scan speed, gap distance between CPC and regolith, simulant type and preparation, number of passes of the spot over the same location on the regolith tray, hatch spacing, scan strategy, and optical power output. Custom g-code was developed to operate the x, y translation tray for exploring the expansive design space of sintering and melting regolith.

The results of the first day of open-air testing with system 700 mounted to the larger SCU concluded that heating of the regolith could produce a range of alterations to the soil from minor discoloration to a full melt. Some wetting of the melted regolith to a bisque build plate was also explored and demonstrated translation speeds were explored along with power settings ranging from #4 and #10, with #10 being the maximum optical power possible from the SCU, and #4 corresponding to approximately 40% of the max power.

Day 1 open air system 700 testing with the large SCU indicated a range of alterations to the regolith surface from minor discoloration to full melt. However, cohesive structures were only observed when melting was present, and no bonded structure was obtained without at least partial melting of the regolith. Therefore, the objective of achieving sintering needed greater clarity as to what constituted a desirable process for additive manufacturing. Day 2 of open-air system 700 testing was conducted to try to achieve a sintered structure both with and without melting of the regolith. This investigation was directed at first attempting to achieve solid state sintering by bringing the regolith to below melting temperature and maintain those temperatures for an extended period of time by repeatedly passing the concentrated solar spot over the same location of regolith at lower relative power settings. Again, however, no cohesive structure was achieved without some melting of the regolith taking place.

The sintering and melting process was observed directly through micrograph investigation. Faster speeds were shown to produce melting of the basalt particles which then bonded the surrounding anorthosite particles into a webbed structure. At slower speeds which delivered more energy to the regolith, continued melting of the basalt was observed and color change and melting was then observed for the anorthosite particles as well. The process conditions which yielded increased melting showed significant promise for being able to produce bonded structures through the regolith which, when scaled and repeatably controlled, could lead to additively manufactured parts and structures from a regolith feedstock.

An additional exploration was made into passing the concentrated solar spot over the same location of regolith multiple times at a power level which would only cause minimal melting from a single pass. Structure was again observed within the repeatably heated regolith which mimicked the structures found from a single pass at higher power and/or at slower translation speeds. This indicated that bonded regolith could be achieved by simply delivering a requisite amount of optical energy density to the regolith and that the process of producing additively manufactured regolith parts and structures could be better understood through an analysis of the optical energy delivered to a given area of regolith provided that melting temperatures are reached.

A more in-depth exploration was made into the possible bonded structures that could be produced by melting some or all of the regolith over a given area following the observation that solid state sintering was not a desirable process for generating bonded regolith structures through localized heating by CSE.

Day 3 of open-air testing was conducted with the system 700 integrated with the large SCU. These tests were performed by first compacting the CSM-LHT-1 Highlands regolith simulant within the sample trays using a smooth roller for achieving maximum compaction. A range of scan speeds between 12.5 mm/min and 625 mm/min were again explored along with various hatch spacing, optical power outputs, number of scans over the same area of regolith, and scan strategies. The results from the compacted and selectively melted regolith showed that bonded structures were easily formed on the surface of the regolith. The melted regolith bonded unmelted regolith and also proved capable of forming a fully melted surface at higher powers and slower scan speeds.

A total of nine (9) test coupons were produced from a single regolith tray, measuring roughly 18.75×18.75 mm in area. These 2D coupons could be removed from the regolith surface and handled while maintaining their shape and structure. Each of the nine (9) coupons was removed from the regolith tray and the combined mass of melted regolith and lightly sintered material was measured for each. The lightly sintered material on the underneath side of each coupon was gently removed from the coupon either by an air blower or by a small brush. Once the loosely sintered material was removed, the mass of the cleaned test coupon consisting of mostly melted material was again measured to estimate the mass of melted material in each coupon.

The optical energy delivered to the regolith surface to produce each test coupon was calculated and compared. Note that these optical energies are only a relative measure of the optical energy required to produce each specimen and that additional analysis is required on the optical efficiency of the system 700 CPCs in order to calculate the true optical energy used for each specimen with this work planned in the next reporting period. A relative measure of optical energy was then measured with a separate test aimed at achieving solid state sintering without melting. This comparison further supported the findings that less optical energy is required to partially and even fully melt the regolith than is required to heat a larger area to sintering temperatures below melting temperatures, and that the resulting melted regolith formed a cohesive bonded structure unlike the area raised to below melting temperatures which did not form any noticeable bonding or surface structure.

Throughout this series of demonstration tests, the physical condition of the system 700 and of the reflective CPC was monitored to identify if any damage or fouling occurred. For open-air testing with the mini-SCU, the small initial gap distance of 0.6 mm between CPC and regolith allowed for some regolith to enter the bottom of the CPC and rise along its sides, leading to regolith particles resting on the reflective surface of the CPC. In these tests, extensive contact was made between system 700 and regolith for repeated grinding of the bottom of the system 700 against partially melted portions of the regolith which led to scraping and discoloration of the system 700 near the outlet of the CPC.

Contact between the CPC 722 of the system 700 and regolith was significantly reduced or eliminated once a larger gap distance of 2 mm was selected while maintaining high optical power densities at the regolith surface. However, some sputtering and ejected material was still observed along the inside of the reflective CPC following hours of use. Snapshots of the 45-degree acceptance angle CPC at multiple times during Day 3 of the open-air tests of the system 700 integrated with the large SCU. Note that an unexpected buildup of material was witnessed at the end of Day 3, the source of which is currently unknown. The buildup was rapid and not fitting of observations made of the CPC following any other day of testing. Two potential sources for this buildup are either a piece of foreign debris from the air or vapor deposited within the CPC. Further investigation and analysis are required to determine the nature and source of the buildup observed on Day 3 of SCU testing. Some minor fouling was also observed on the underneath side of system 700 near the CPC outlet. No loss of performance was observed for the CPC due to the presence of regolith particles or the object observed within the CPC. However, to better characterize the potential reduction in optical efficiency of the CPC during operation of SEER, the 45-deg. acceptance angle CPC was stored without cleaning the inner reflective surface in order to perform a more in-depth analysis of transmission efficiency of the CPC used for these regolith sintering and melting demonstration tests to compare its performance to an unused and polished CPC of identical geometry.

An additional exploration was also made for the 26.56 deg. acceptance angle CPC used in Day 1 of open air SCU tests. The CPC was filled entirely with regolith and allowed to flow out the bottom, such that regolith coated the inner surface of the CPC. The CPC was then exposed to CSE to determine whether the surface could be cleaned using only the primary concentrator. Some portions of the CPC did indeed become cleared of regolith and regained a reflective finish as the regolith melted and formed molten balls within the CPC. However, a substantial portion of the regolith remained within the CPC which would likely lead to significantly reduced optical efficiencies. Further investigation is needed on the application of high heats as a cleaning mechanism for the reflective CPC.

A final series of sintering and melting tests were then performed within the vacuum chamber at pressures of around 10 mTorr over two days of demonstration testing. Several interesting findings emerged from these vacuum tests. First, the system 700 operated successfully in vacuum without observable failure or damage to the CPC. Second, melting was observed within a tray of compacted CSM-LHT-1 across a wide range of scan speeds. Third, sintered and partially melted structures were again obtained by the system 700 in vacuum. Fourth, some outgassing of the melted regolith was observed both through the presence of bubbles trapped within the resultant glass structures and through the presence of regolith particles on the upper surface of the system 700 that were apparently ejected by the boiling surface. This outgassing was confirmed through the history of pressure vs. time measurements within the chamber which showed a dramatic increase in pressure as the regolith was exposed to the concentrated solar energy. Fifth, the color of the melted product took on a significantly greener tint in vacuum than in atmosphere. Sixth, the melted surface rose higher above the regolith surface than in atmospheric testing, likely also due to outgassing. Seventh, a visible ring was seen at the bottom of the system 700 around the CPC outlet, the cause of which is unknown.

Note that other methods of use of the disclosed falling particle receiver system are possible. For example, the system may be applied to other extractive processes on the Moon and Earth, such as direct air capture of carbon dioxide. Also, any of the steps, functions, and operations discussed herein can be performed continuously and automatically. In some embodiments, one or more of the steps of the method of use may comprise computer control, use of computer processors, and/or some level of automation.

The exemplary systems and methods of this disclosure have been described in relation to systems and methods involving a particle receiver system for precise and controlled sintering of lunar regolith. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A particle receiver system comprising:
   a supplemental concentrator configured to receive a primary concentrator light pattern from a primary concentrator and output a supplemental concentrator output light pattern, the supplemental concentrator comprising reflective optics, the supplemental concentrator output light pattern having a second light profile and the primary concentrator having a first light profile;
   a sweeping fluid device configured to circulate a sweeping fluid within the supplemental concentrator;
   a cooler comprising cooling fluid configured to enable temperature control of the supplemental concentrator;
   an actuator configured to position the supplemental concentrator relative to an irradiating location;
   a working material feed configured to deliver a working material to the irradiating location; and
   a controller configured to control each of: i) the actuator, ii) the temperature of the supplemental concentrator, and iii) the temperature of the irradiating location;
   wherein:
   the supplemental concentrator output light pattern irradiates the working material at the irradiating location to yield a reacted material.

2. The system of claim 1, wherein the second light profile is a spatially reduced light profile relative to the first light profile.

3. The system of claim 1, wherein the supplemental concentrator is a compound parabolic concentrator and the particle receiver system is a falling particle receiver system.

4. The system of claim 1, wherein the reacted material enables at least one of thermal energy storage and electricity generation.

5. The system of claim 1, further comprising a gas collector configured to collect any gas produced from the reacted material.

6. The system of claim 1, wherein the cooler encircles the supplemental concentrator and comprises a heat exchange surface.

7. The system of claim 1, wherein the controller is further configured to control a speed of delivery of the working material.

8. The system of claim 1, wherein:
   the working material feed is further configured to deliver the working material relative to the supplemental concentrator output light pattern to improve solar-to-thermal efficiency.

9. The system of claim 1, wherein the working material is preheated by heat associated with the supplemental concentrator prior to a delivery of the working material to the irradiating location.

10. The system of claim 1, wherein the cooler is engaged with at least one of a radiator and a set of heat pipes to bound the temperature of the supplemental concentrator.

11. A particle receiver system comprising:
    a system body forming an enclosed volume and configured to receive a primary concentrator light pattern from a primary concentrated light source;
    a plated body disposed within the enclosed volume and comprising an annular void and configured to receive a cooling fluid inlet and a cooling fluid outlet, the annular void comprising a supplemental concentrator;
    a particle feed system disposed adjacent an outlet of the supplemental concentrator, the particle feed system configured to convey a set of working particles to the outlet of the supplemental concentrator; and
    a cooling fluid configured to flow into the cooling fluid inlet and out from the cooling fluid outlet;
    wherein:
    the supplemental concentrator receives the primary concentrator light pattern and outputs a supplemental concentrator output light pattern having a spatially reduced light profile relative to the primary concentrator output light profile; and
    the a set of working particles conveyed by the particle feed system are irradiated by the supplemental concentrator output light pattern to yield a reacted material.

12. The system of claim 11, further comprising a working material feed configured to dispose the working material on a surface of the particle feed system.

13. The system of claim 11, further comprising a controller configured to control at least one of: i) the temperature of the supplemental concentrator, and ii) the temperature of the set of working particles.

14. The system of claim 11, wherein the supplemental concentrator is a compound parabolic concentrator and the particle receiver system is a falling particle receiver system.

15. The system of claim 11, wherein the reacted material enables at least one of thermal energy storage and electricity generation.

16. The system of claim 11, wherein the particle feed system is further configured to deliver the set of working particles relative to the supplemental concentrator output light pattern to improve solar-to-thermal efficiency.

17. The system of claim 11, wherein the set of working particles are preheated by heat associated with the supplemental concentrator prior to an irradiation of the set of working particles by the supplemental concentrator output light pattern.

18. The system of claim 11, further comprising at least one of a radiator and a set of heat pipes to bound the temperature of the supplemental concentrator.

19. A particle receiver system comprising:
- a supplemental concentrator configured to receive a primary concentrator light pattern from a primary concentrator and output a supplemental concentrator output light pattern, the supplemental concentrator comprising reflective optics, the supplemental concentrator output light pattern having a second light profile and the primary concentrator having a first light profile;
- a sweeping fluid device configured to circulate a sweeping fluid within the supplemental concentrator;
- a cooler comprising cooling fluid configured to enable temperature control of the supplemental concentrator, the cooler enclosing the supplemental concentrator and comprising a heat exchange surface;
- an actuator configured to position the supplemental concentrator relative to an irradiating location;
- a working material feed configured to deliver a working material to the irradiating location and to improve solar-to-thermal efficiency relative to the supplemental concentrator output light pattern; and
- a controller configured to control each of: i) the actuator, ii) the temperature of the supplemental concentrator, iii) the temperature of the irradiating location, and iv) a speed of delivery of the working material;

wherein:
- the second light profile is a spatially reduced light profile relative to the first light profile;
- the set of working particles are preheated by heat associated with the supplemental concentrator prior to delivery of the set of working particles to the irradiating location;
- the supplemental concentrator output light pattern irradiates the working material at the irradiating location to yield a reacted material; and
- the reacted material enables at least one of thermal energy storage and electricity generation.

20. The system of claim 19, further comprising:
- a gas collector configured to collect any gas produced from the reacted material;

wherein:
- the supplemental concentrator is a compound parabolic concentrator; and
- and the particle receiver system is a falling particle receiver system.

\* \* \* \* \*